US007000108B1

(12) United States Patent
Yarsa et al.

(10) Patent No.: US 7,000,108 B1
(45) Date of Patent: Feb. 14, 2006

(54) SYSTEM, APPARATUS AND METHOD FOR PRESENTATION AND MANIPULATION OF PERSONAL INFORMATION SYNTAX OBJECTS

(75) Inventors: Julianne Yarsa, Austin, TX (US); Anthony Nadalin, Austin, TX (US); Bruce A. Rich, Round Rock, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,162

(22) Filed: May 2, 2000

(51) Int. Cl.
 *H04L 9/00* (2006.01)
 *H04K 1/00* (2006.01)
(52) U.S. Cl. .................. 713/167; 713/150; 713/153; 713/155; 713/160; 713/176; 713/182
(58) Field of Classification Search ............... 713/150, 713/151, 152, 153, 154, 155, 156, 160, 167, 713/176, 182
 See application file for complete search history.

(56) References Cited

U.S. PATENT DOCUMENTS

| 5,414,801 A | | 5/1995 | Smith et al. ............... 395/119 |
| 5,497,422 A | * | 3/1996 | Tysen et al. ............... 713/157 |
| 5,544,302 A | | 8/1996 | Nguyen ..................... 395/161 |
| 5,671,379 A | | 9/1997 | Kuse et al. ................. 395/346 |
| 5,737,507 A | | 4/1998 | Smith ........................ 395/133 |
| 5,870,611 A | | 2/1999 | London Shrader et al. . 395/712 |
| 5,873,106 A | | 2/1999 | Joseph ....................... 707/506 |
| 5,929,851 A | | 7/1999 | Donnelly .................... 345/333 |
| 6,185,684 B1 | * | 2/2001 | Pravetz et al. .............. 713/182 |
| 6,205,549 B1 | * | 3/2001 | Pravetz ...................... 713/182 |
| 6,367,012 B1 | * | 4/2002 | Atkinson et al. ........... 713/176 |

FOREIGN PATENT DOCUMENTS

JP  11-242704  9/1999

OTHER PUBLICATIONS

Iannamico, "Pretty Good Privacy, PGP for Personal Privacy, Version 5.0 User's Guide", 1997, PGP, Inc., USA, XP-002270873, pp. i-126.
Luckhardt, "Pretty Good Privacy", CT Magazin Fuer Computer Tchnik, Verlag Heinz Heise GMBH, Hannover, DE, No. 13, Jun 21, 1999, pp. 208-210, XP-000828976.

* cited by examiner

*Primary Examiner*—Matthew Smithers
*Assistant Examiner*—Courtney D. Fields
(74) *Attorney, Agent, or Firm*—Duke W. Yee; Jeffrey S. LaBaw; Betty Formby

(57) ABSTRACT

A system, apparatus and method for processing Personal InFormation EXchange Syntax (PFX) objects in a data processing system is presented. The PFX object may be formatted, i.e. may maintain a syntax, as defined by PKCS (Public Key Cryptography Standard) standards, and in particular PKCS #12. A PFX object utility allows a user to view and edit the contents of data objects embedded within a PFX object via a graphical user interface. Graphical objects represent the data objects embedded within a PFX object. A user may drag and drop objects onto other objects within the PFX object, and the PFX object utility automatically performs the necessary operations.

57 Claims, 9 Drawing Sheets

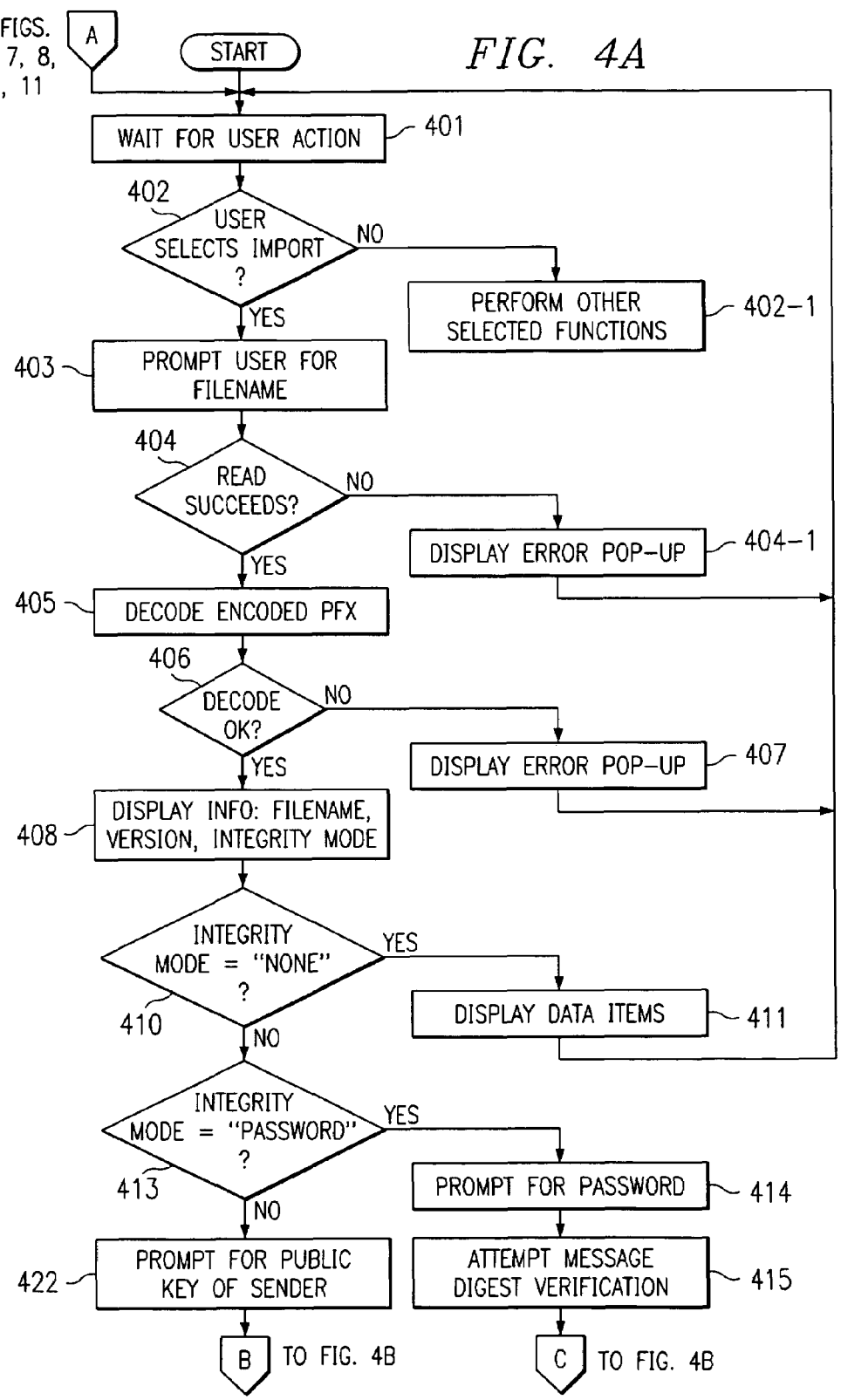

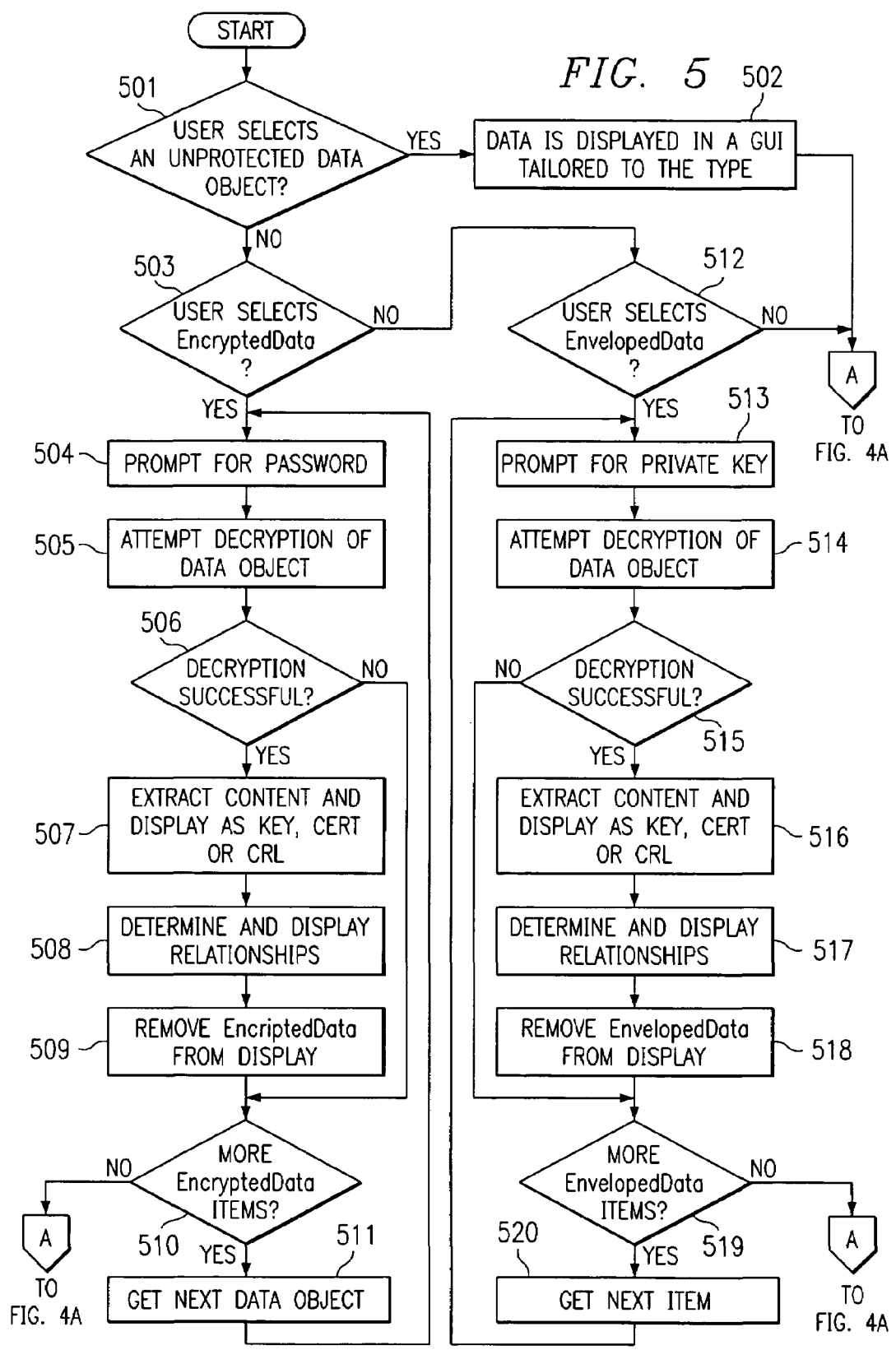

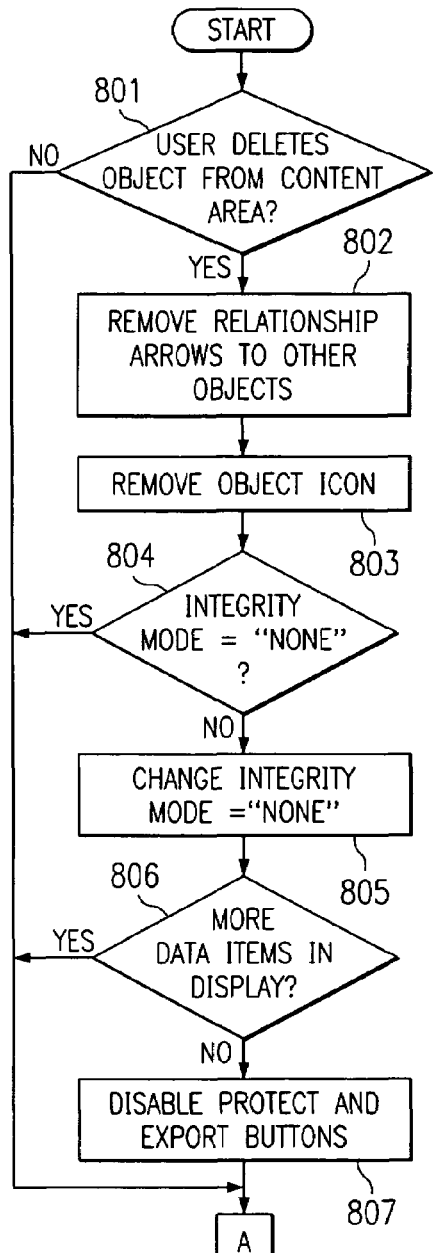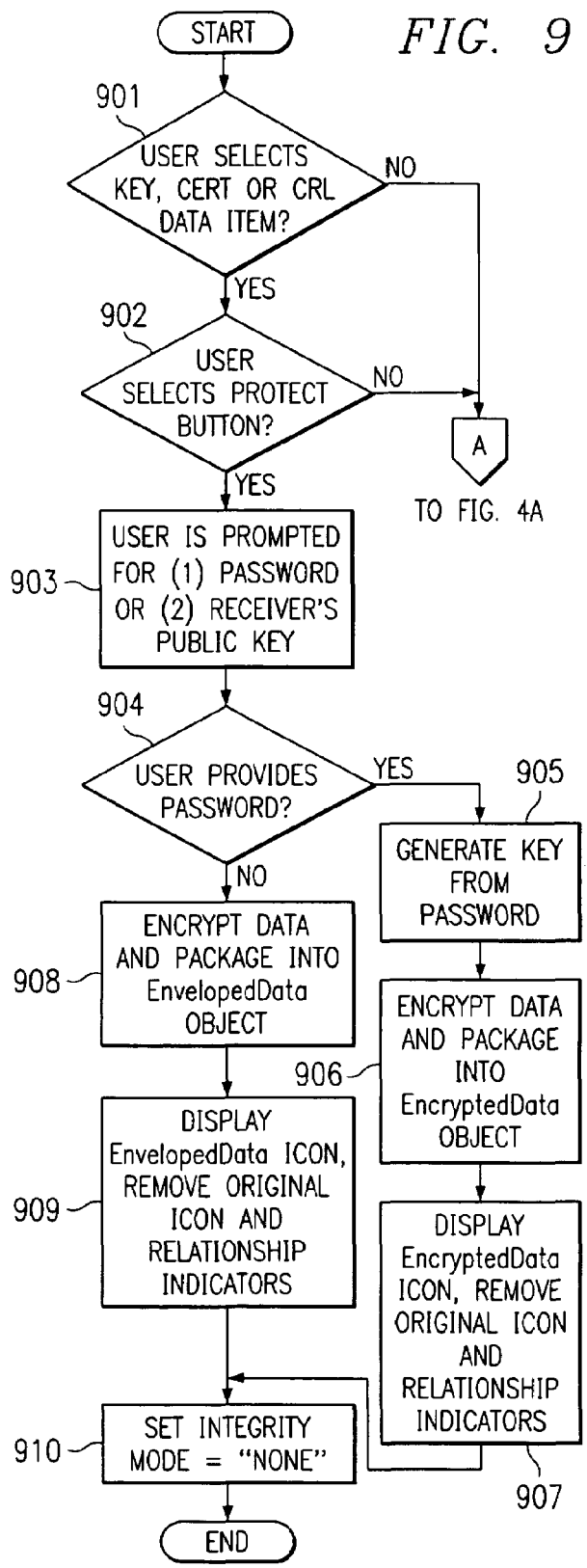

SYSTEM, APPARATUS AND METHOD FOR PRESENTATION AND MANIPULATION OF PERSONAL INFORMATION SYNTAX OBJECTS

RELATED APPLICATION

This application is related to similar subject matter as co-pending and commonly assigned U.S. patent application Ser. No. 09/460,839 entitled "Method and System for Presentation and Manipulation of PKCS Enveloped-Data Objects," which is hereby incorporated by reference.

BACKGROUND OF THE INVENTION

1. Technical Field

The present invention relates generally to an improved data processing system and, in particular, to a system, apparatus and method for processing Personal InFormation EXchange Syntax (PFX) objects formatted according to interoperability standards.

2. Description of Related Art

Public-key cryptography is the technology in which encryption and decryption involve different keys. The two keys are the public key and the private key, and either can encrypt or decrypt data. A user gives his or her public key to other users, keeping the private key to himself or herself. Data encrypted with a public key can be decrypted only with the corresponding private key, and vice versa.

As public-key cryptography has gained acceptance, standards have become necessary so that software at two different sites could work together even when the software is developed by different vendors. In particular, standards have been developed to allow agreement on digital signatures, digital enveloping, digital certification, and key agreement. However, interoperability requires strict adherence to communicable formats, and PKCS, or "Public Key Cryptography Standard," provides a basis for interoperable standards in heterogeneous environments.

PKCS is a set of documents published by RSA Laboratories that serves to define data types and algorithms used in public-key cryptography. The first set of ten PKCS standards was released in 1991. In the 1993 release PKCS #2 and #4 were incorporated into PKCS #1, so the set of standards included:

PKCS #1: RSA Encryption Standard;
PKCS #3: Diffie-Hellman Key Agreement Standard;
PKCS #5: Password-Based Encryption Standard;
PKCS #6: Extended-Certificate Syntax Standard;
PKCS #7: Cryptographic Message Syntax Standard;
PKCS #8: Private-Key Information Syntax Standard;
PKCS #9: Selected Attribute Types; and
PKCS #10: Certification Request Syntax Standard.

PKCS continues to evolve and the following standards have been added since 1993:

PKCS #11: Cryptographic Token Interface Standard;
PKCS #12: Personal Information Exchange Syntax Standard;
PKCS #13: Elliptic Curve Cryptography Standard; and
PKCS #15: Cryptographic Token Information Format Standard.

Two independent levels of abstraction have been provided by these standards. The first level is message syntax, and the second level is specific algorithms. The intention has been that message syntax and specific algorithms should be orthogonal. In other words, a standard for the syntax of digitally signed messages should be able to work with any public-key algorithm, not just RSA, the public-key algorithm invented by Rivest, Shamir, and Adleman involving exponentiation modulo the product of two large prime numbers; and a standard for RSA should be applicable to many different message syntax standards.

One of these standard documents, PKCS #9, defines a set of attributes that can be used in other PKCS standards. In particular, PKCS #9 defines selected attribute types for use in PKCS #6 extended certificates, PKCS #7 digitally signed messages, PKCS #8 private-key information, PKCS #12 personal information, and PKCS #15 cryptographic token information.

PKCS #12 describes a standard that defines the syntax for the secure transfer of personal identity information, such as private keys, certificates, Certificate Revocation Lists (CRLs), and the like. Under this standard, data is packaged into a well-defined Protocol Data Unit (PDU) according to Personal InFormation EXchange Syntax (PFX). Over time, such a standard protocol data unit has become known familiarly as a "PFX". The PFX can then be encoded into a standard format byte stream according to the Distinguished Encoding Rules (DER). This standard format allows PFX objects produced on one system, i.e. the operating environment defined by the hardware system, operating system and application, to be transmitted to a completely different system and decoded there.

Each data item in a PFX can be independently protected from exposure during transmission by one of two privacy modes:

1. Public-key privacy mode, in which the data is encrypted with the public key of the receiver and the data can be decrypted at the receiver with the corresponding private key; and
2. Password-based privacy mode, in which the data is encrypted with a shared secret key (symmetric key) derived from an input password and the data can be decrypted with the same key at the receiver. Alternatively, the data may be left unprotected, i.e. no encryption.

The PFX is itself protected from data tampering by one of two integrity modes:

1. Public-key integrity mode, in which a digital signature on the entire PFX is produced using the sender's private key and the signature can be verified using the corresponding public key at the receiver; and
2. Password-based integrity mode, in which a message authentication code is produced by digesting the entire PFX with the HMAC-SHA1 message digest algorithm. The HMAC key is derived from an input password. At the receiver, the digest is re-generated using the same input password and compared against the attached digest. If the two digests match, the content integrity is verified. The password used for data integrity may or may not match password(s) used for data privacy. As with data privacy, there is the option that no mechanism be used to protect data integrity.

Thus, individual personal information data items can be packaged into a PFX and each data item may be independently protected by data encryption. Data integrity of the entire PFX can be assured by the attachment of a digital signature or message digest. The final PFX can then be DER encoded into a standard format and transmitted to a receiving entity. The receiver decodes the DER encoded object into a PFX and verifies the data integrity. Finally, individual data items are extracted by decrypting with the appropriate key.

With all the attributes that are part of a PFX object, administrators, applications developers, and other users can easily be lost in details. They may have access to all the integral objects used in creating a PFX object, such as certificate files, private key files, and any passwords or keys used for data protection, but they may lack the application or means to merge the objects together to create a PFX object. In other situations, users may receive a PFX object as an external file for which they do not have a targeted application or that they do not wish to be automatically included in a targeted application.

Therefore, it would be advantageous to have an improved system, apparatus and method for presenting and manipulating secure data objects using interoperable standards in a heterogeneous environment, such as using PKCS within a distributed computing environment. It would be still more advantageous to provide users with a system, apparatus and method to graphically construct a PFX object as well as view and manipulate a PFX object that has been stored or received.

SUMMARY OF THE INVENTION

A system, apparatus and method for processing personal information data objects, such as Personal InFormation EXchange Syntax (PFX) objects, in a data processing system is presented. The PFX object may be formatted, i.e. may maintain a syntax, as defined by, for example, PKCS (Public Key Cryptography Standard) standards, and in particular PKCS #12. A personal information data object utility allows a user to view and edit the contents of data objects embedded within a personal information data object via a graphical user interface. Graphical objects represent the data objects embedded within a personal information data object. A user may drag and drop objects onto other objects within the personal information data object, and the personal information data object utility automatically performs the necessary operations.

Logical associations between data objects contained within the personal information data object, such as between certificates and data objects, are determined or created, and the logical associations are displayed using visual indicators, such arrows or other links, between graphical objects representing the associated data objects. As data objects are added or deleted through user actions on the graphical objects, the visual indicators are updated to reflect any updates to the logical associations between the data objects. The user may direct other operations on the personal information data object through the graphical user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B is a flowchart outlining an exemplary operation of the present invention when importing and verifying PFX object contents;

FIG. 5 is a flowchart outlining an exemplary operation of the present invention when displaying data and decrypting data objects;

FIG. 8 is a flowchart outlining an exemplary operation of the present invention when removing data objects from a PFX object;

FIG. 9 is a flowchart outlining an exemplary operation of the present invention when protecting PFX object data privacy;

DETAILED DESCRIPTION OF THE PREFERRED EMBODIMENT

Figure 1:
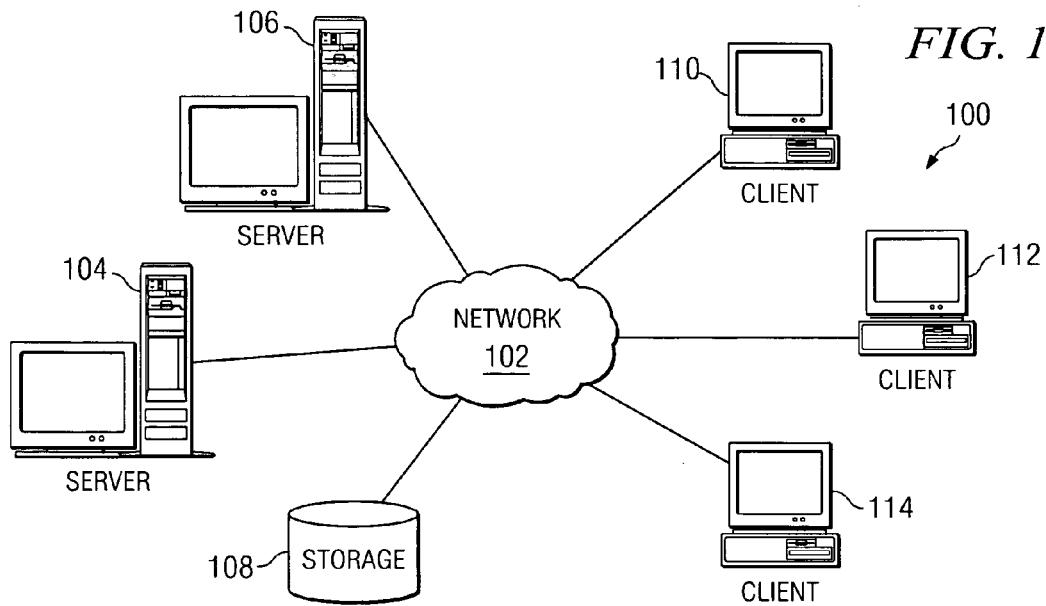
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and server 106 is connected to network 102 along with storage unit 108. In addition, clients 110, 112, and 114 also are connected to network 102. These clients 110, 112, and 114 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 110–114.

Clients 110, 112, and 114 are clients to server 104. Additionally, clients 110–114 also may be clients to server 106 in these examples. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet, a local area network (LAN), or a wide area network (WAN). FIG. 1 is intended as an example of a heterogeneous computing environment and not as an architectural limitation for the present invention.

Figure 2A:
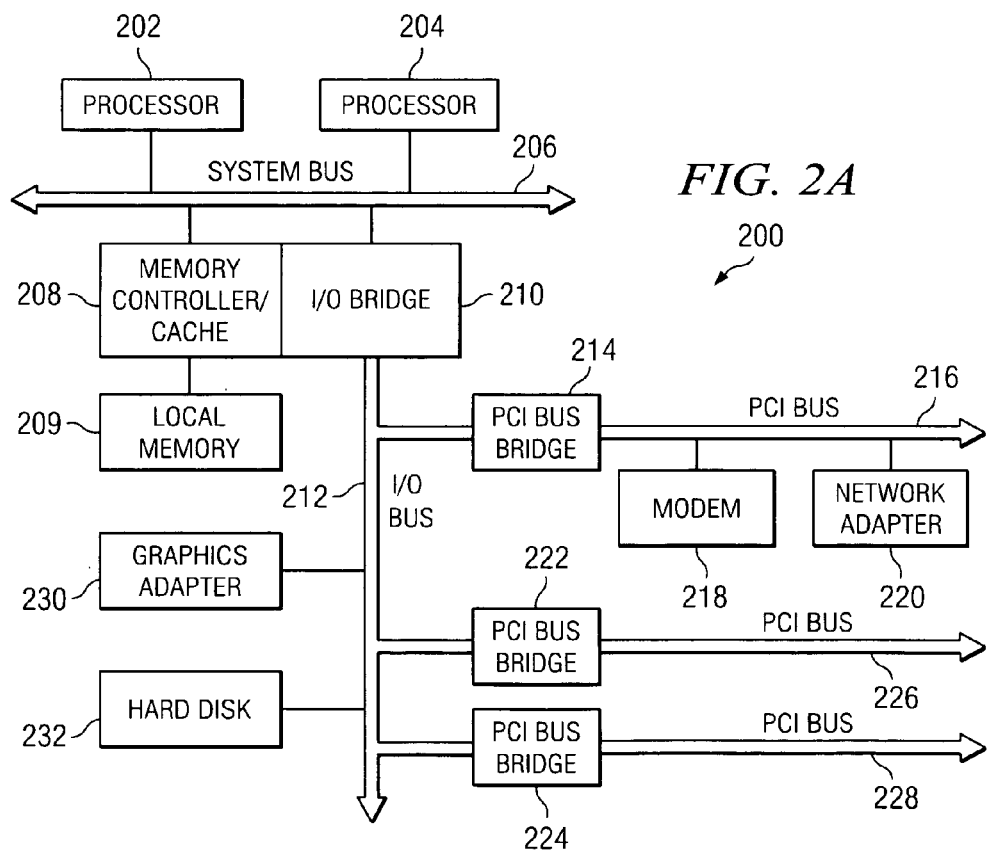
FIG. 2A is a block diagram depicting a data processing system that may be implemented as a server.

With reference now to FIG. 2A, a block diagram depicting a data processing system that may be implemented as a server, such as server 104 or server 106 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drives and the like, also may be used in addition to or in place of the hardware depicted. The depicted example is not meant to imply architectural limitations with respect to the present invention. The data processing system depicted in FIG. 2A may be, for example, an IBM RISC/System 6000 system, a product of International Business Machines Corporation in Armonk, N.Y., running the Advanced Interactive Executive (AIX) operating system. Alternatively, the operating system may be another commercially available operating system such as JavaOS For Business™ or OS/2™, which are also available from IBM. JavaOS is loaded from a server on a network to a network client and supports Java programs and applets. An object oriented programming system such as Java may run in conjunction with the operating system and may provide calls to the operating system from Java programs or applications executing on the data processing system.

The present invention provides a method, a system or apparatus, and computer-implemented instructions for processing cryptographic data objects, such as Personal InFormation EXchange Syntax (PFX) objects, on a variety of computer platforms and operating systems. Although the present invention could be implemented in most computer languages, it is preferably implemented in Java due to the ability to run Java code in a distributed, heterogeneous environment. Hence, the present invention may operate within a Java runtime environment and operate in conjunction with a Java virtual machine (JVM) yet within the boundaries of a JVM as defined by Java standard specifications. In order to provide a context for the present invention, portions of the operation of a JVM according to Java specifications are herein described.

Figure 2B:
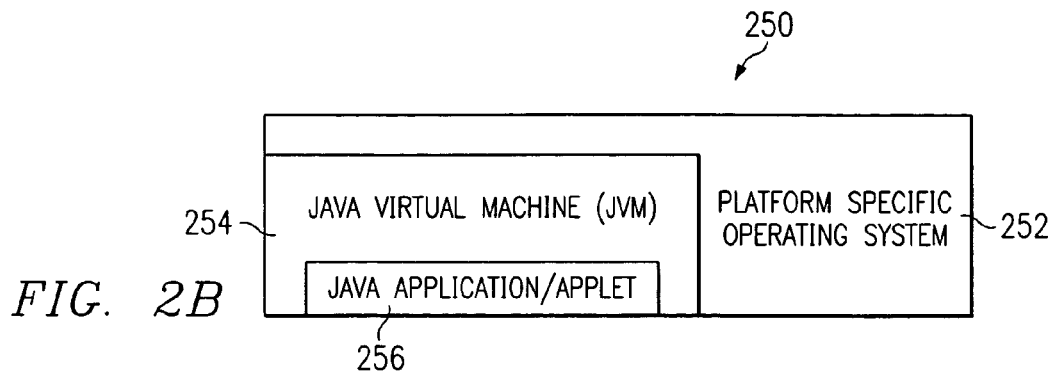
FIG. 2B is a block diagram illustrating the relationship of software components operating within a computer system that may implement the present invention.

With reference now to FIG. 2B, a block diagram illustrates the relationship of software components operating within a computer system that may implement the present invention. Java-based system 250 contains platform specific operating system 252 that provides hardware and system support to software executing on a specific hardware platform. JVM 254 is one software application that may execute in conjunction with the operating system. JVM 254 provides a Java runtime environment with the ability to execute Java application or applet 256, which is a program, servlet, or software component written in the Java programming language. The computer system in which JVM 254 operates may be similar to data processing system 200 described above. However, JVM 254 may be implemented in dedicated hardware on a so-called Java chip, Java-on-silicon, or Java processor with an embedded picoJava core.

At the center of a Java runtime environment is the JVM, which supports all aspects of Java's environment, including its architecture, security features, mobility across networks, and platform independence. The JVM is a virtual computer, i.e. a computer that is specified abstractly. The Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for hardware platforms, such as mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

The data processing systems described above with respect to FIGS. 1–2B may be used to create, modify, transmit, store, and receive cryptographic data objects formatted according to interoperably defined cryptography standards, and in particular, PKCS #12 personal information data objects. The following discussion provides background information on the utility of security objects such as certificates, signatures, public keys, private keys, and the like.

A certificate is a digital document that vouches for the identity and key ownership of an individual, a computer system, a specific server running on that system, or an organization. For example, a user's certificate verifies that the public key associated with the certificate belongs to the user. Certificates are issued by certificate authorities. These authorities are responsible for verifying the identity and public key ownership of the individual before issuing the certificate. An identity certificate is a digitally signed statement from one entity, saying that the public key of some other entity has some particular value.

Public keys are numbers associated with a particular entity, and are intended to be known to everyone who needs to have trusted interactions with that entity. An entity is a person, organization, program, computer, business, bank, etc. If some data is digitally signed, it has been stored with the "identity" of an entity and a signature that proves that entity knows about the data. A signature is computed from some data and the private key of an entity.

Private keys are numbers that are supposed to be known only to a particular entity, i.e. kept secret. In a typical public key cryptographic system, a private key corresponds to exactly one and only one public key.

Certificates rely on public key cryptographic systems in which (a) private and public keys are paired, (b) private keys are used to sign or encrypt, and (c) public keys are used to verify signatures or decrypt. A certificate authority (CA) is an entity (e.g., a business) that is trusted to sign (issue) certificates for other people (entities). It usually has some kind of legal responsibilities for its vouching of the binding between a public key and its owner that allow one to trust the entity that signed a certificate.

There are two basic techniques used to get certificates: (1) make one oneself using the proper software, or (2) ask someone else, such as a certificate authority, to issue one. There are two main inputs to the certificate creation process. The first input is a pair of matched public and private keys generated using some special software. Only the public key is ever shown to anyone else. The private key is used to sign data; if someone improperly has access to someone else's private key, they can forge legal documents attributed to a third party. The second input is information about the entity being certified, such as an individual. This normally includes information such as a name and organization address. If a certificate authority issues a certificate, one will normally need to provide proof of identity.

If a certificate authority issues a certificate for an individual, the individual must provide a public key and some information about himself. A tool, such as Netscape Navigator or Internet Explorer, may digitally sign this information and send it to the certificate authority. The certificate authority might be a company that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

The X.509 standard is one of many standards that defines what information can go into a certificate and describes the data format of that information. The "version" field indicates the X.509 version of the certificate format (1, 2, or 3), with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be "extended" in a standardized and generic fashion to include additional information. In addition to the traditional fields in public key certificates (i.e. those defined in versions 1 and 2 of X.509), version 3 comprises extensions referred to as "standard extensions". The term "standard extensions" refers to the fact that the version 3 X.509 standard defines some broadly applicable extensions to the version 2 certificate. However, certificates are not constrained to only the standard extensions and anyone can register an extension with the appropriate authorities (e.g., ISO). The extension mechanism itself is completely generic.

The "serial number" field specifies the unique, numerical identifier of the certificate in the domain of all public key certificates issued by a particular certificate authority (CA) in order to distinguish one certificate from another. When a certificate is revoked, it is actually the certificate serial number that is posted in a certificate revocation list signed by the certificate authority since posting the entire certificate would be wasteful and completely unnecessary. It is for this reason that the serial number for each certificate in the domain must be unique. The "signature algorithm" field identifies the algorithm used by the certificate authority to sign the certificate. The algorithm identifier, which is a number registered with an internationally-recognized standards organization (e.g., ISO), specifies both the public-key algorithm and the hashing algorithm used by the certificate authority to sign certificates.

The "issuer name" field specifies the X.500 Distinguished Name (DN) of the certificate authority that issued the certificate. For example, the Distinguished Name "c=US, O=ACME Corporation" might be used as the Distinguished Name for the certificate authority issuing certificates to the employees of the ACME Corporation in the United States. In some cases, such as root or top-level certificate authority certificates, the issuer signs its own certificates. The "validity period" field specifies the dates and times for the start date and the expiration date of the certificate. Every time a certificate is used, the software should examine the certificate to ensure it is still within its validity period. Each certificate is valid only for a limited amount of time, but this period can be as short as a few seconds or almost as long as a century. The validity period depends on a number of factors, such as the strength of the private key used to sign the certificate or the amount one is willing to pay for a certificate.

The "subject name" field specifies the X.500 Distinguished Name of the entity holding the private key corresponding to the public key identified in the certificate; for example, the Distinguished Name "c=US, o=ACME Corporation, cn=John M. Smith" might be the Distinguished Name for employee John M. Smith of the ACME corporation, where "cn" stands for "common name", "o" is "organization", and "c" is "country".

The "public key" field is the public key of the entity being named or identified by the certificate. The "subject public key information" field identifies two important pieces of information: a) the value of the public key owned by the subject, and b) the algorithm identifier specifying the algorithm with which the public key is to be used. The algorithm identifier specifies both the public-key algorithm and the hashing algorithm.

The "issuer unique identifier" field was added to the X.509 certificate definition as part of the version 2 standard. The field, which is optional, provides a location to specify a bit string to uniquely identify the issuer X.500 name, in the event that the same X.500 name has been assigned to more than one certificate authority over time.

The "subject unique identifier" field was added to the X.509 certificate definition as part of the version 2 standard. The field, which is optional, provides a location to specify a bit string to uniquely identify the subject X.500 name, in the event that the same X.500 name has been assigned to more than one subject over time (e.g., one John M. Smith leaves ACME Corporation and a second John M. Smith joins ACME Corporation two months later). This field is not used by most certificate authorities for various reasons primarily because there are more convenient ways to uniquely identify a subject. Specifically, most certificate authorities use the serialNumber attribute. Such a scheme fits well within an organization's administrative and directory management procedures because employees require a unique identifier in their X.500 common names anyway (e.g., to handle the case where there are two John M. Smith's in the organization at the same time).

X.509 Version 1 has been available since 1988, is widely deployed, and is the most generic. X.509 Version 2 introduced the concept of subject and issuer unique identifiers to handle the possibility of reuse of subject and/or issuer names over time. Most certificate profile documents strongly recommend that names not be reused, and that certificates should not make use of unique identifiers. Version 2 certificates are not widely used.

X.509 Version 3 is the most recent (1996) and supports the notion of extensions, whereby anyone can define an extension and include it in the certificate. Some common extensions in use today are: KeyUsage, which limits the use of the keys for particular purposes such as "signing-only"; and AltNames, which allows other identities to also be associated with this public key, e.g., DNS names, e-mail addresses, IP addresses. Extensions can be marked critical to indicate that the extension should be checked and enforced/used. So, for example, if a certificate has the KeyUsage extension marked critical and set to "keyCertSign" then if this certificate is presented during SSL Communication, it should be rejected, as the certificate extension indicates that the associated private key should only be used for signing certificates and not for SSL.

The keys used to interact with various parties need to be hung in a "key chain." In the physical world, a key ring holds keys, and a wallet holds multiple identification and credit cards. In the digital world, a directory service provides storage for digital keys and certificates. The X.500 and LDAP (Lightweight Directory Access Protocol) standards are two main contenders for directory services. Each entry in the directory service is globally and uniquely identified by a Distinguished Name. For example, John M. Smith, who belongs in the Executive Office department at Acme Corporation, might have the following Distinguished Name: "cn=John M. Smith, ou=Executive Office, o=ACME Corporation, c=US", where "cn" stands for "common name", "ou" is "organizational unit", "o" is "organization", and "c" is "country".

Second-generation directory services store entries in proprietary file formats, hash, B-tree, or Relational Database Management System. Although RDBMS is not necessarily optimized for x.500 Distinguished Names, the maturity, scalability and additional utilities in RDBMS make it an attractive alternative as a directory service repository. X.509v3 certificates and public keys can also be stored and protected in an X.500- or LDAP-based directory service. If a user's private key is compromised, the certificate associated with the public key must be revoked and added to the appropriate certificate authority's Certificate Revocation List (CRL).

As noted previously, with all the attributes that are part of a personal information data object, administrators, applications developers, and other users can easily be lost in details. Such users may have access to all the integral objects used in creating a personal information data object, such as certificate files, private key files, and any passwords or keys used for data protection, but they may lack the application or means to merge the objects together to create a personal information data object.

The present invention provides a graphical user interface methodology for presenting and manipulating personal information data objects, such as PKCS #12 protocol data unit (PDU) objects, also known as PFX objects. Preferably, the graphical user interface and other functionality described in the following figures may be readily implemented in Java to provide the methodology of the present invention in various interoperable, heterogeneous environments. While the present invention will be described with reference to PFX objects, one of ordinary skill in the art will recognize that the principles of the present invention are applicable to any personal information data object regardless of the particular standards used.

Figure 3:
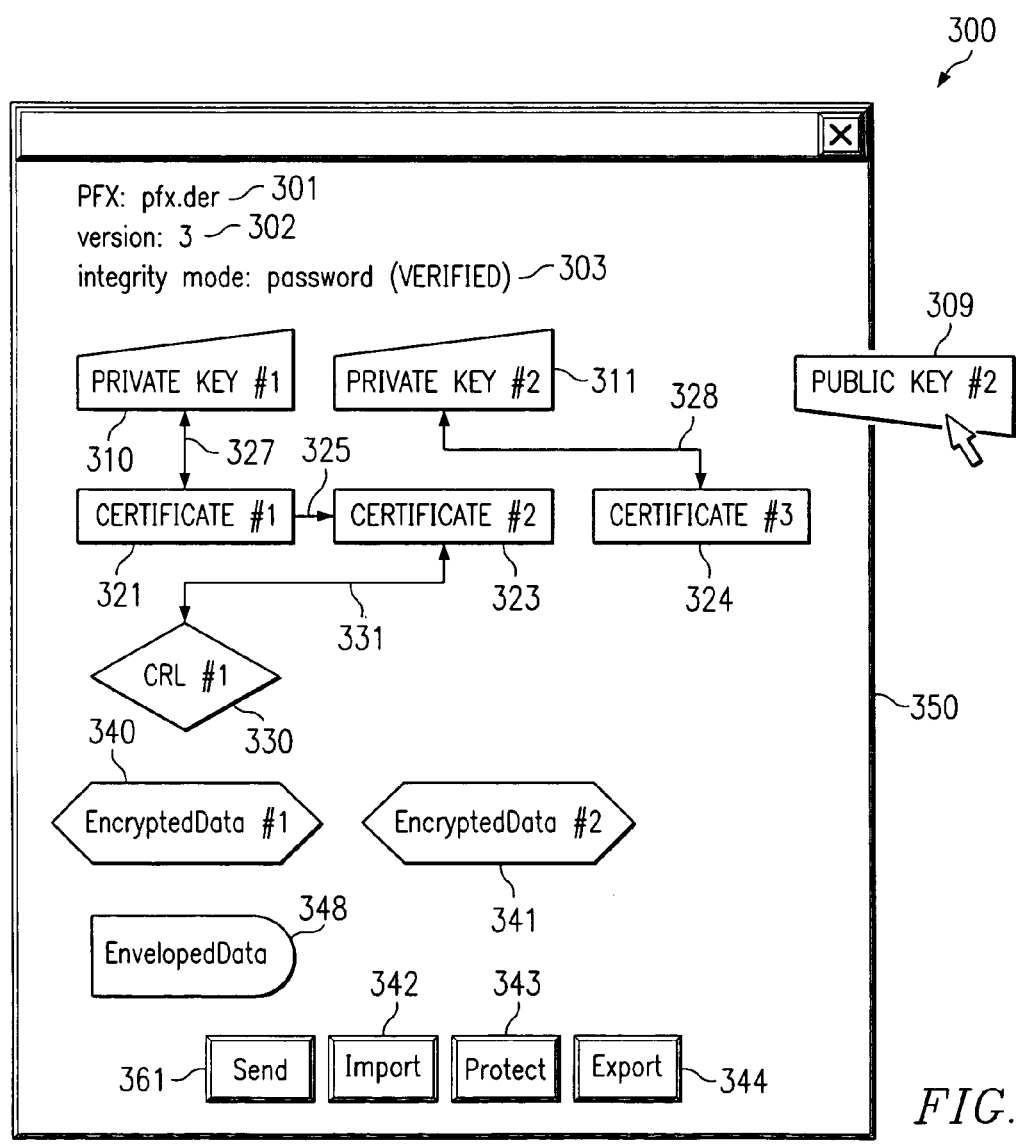
FIG. 3 depicts a dialog window for presenting and manipulating PFX objects.

With reference now to FIG. 3, a display 300 for presenting and manipulating PFX objects is shown in accordance with a preferred embodiment of the present invention. The display 300 provides a visual work area where PFX objects can be created, modified, etc. The display 300 and associated functions in FIG. 3 and the subsequent figures may be implemented as a stand-alone utility or application, or the display 300 and associated functions may be implemented as an applet within a browser-type application or as a portion of some other type of application.

In the descriptions of the following figures, several common user interface events or actions are mentioned, and it should be noted that equivalent user actions may also be employed, as would be apparent to one of ordinary skill in the art. For example, when a drag and drop operation is mentioned, alternative user actions could be employed, such as selecting the file or data object from a file list box or some other import means. Double-clicking on an object would be equivalent to performing a default operation on the PFX object, such as opening and viewing the contents of a PFX object. This action could also be accomplished after right-clicking on the object and selecting the default action, which is usually highlighted in a graphically significant way, or via some other means. In general, users can forgo using menus for most operations.

Although areas of the visual display are used to associate similar objects, other manners of visually indicating associated objects may be employed. For example, objects of similar type may have similar colors or shapes that differ from the colors or shapes of other objects of a different type. Additionally, although arrows are shown as visual indicators for relational links between objects, other visual indicators may be employed. For example, similar shape modifications may be made to objects that have a particular relationship.

As another alternative, if the objects shown in the dialog are too numerous to clearly show their relationships, the user may optionally remove the relationship indicators, or the user may be required to perform some type of user action to request to see the relationships, e.g., by selecting a button or menu, in which case another window is generated to show relationships. Alternatively, the interface utility could automatically expand the interface utility window in order to obtain the visual area necessary to display relationships between objects.

Display 300 in FIG. 3 is a graphical user interface display for a PFX interface utility application that allows a user to view and manipulate cryptographic data objects formatted according to interoperably defined cryptography standards, and in particular, PKCS #12 PFX objects. The user may optionally be provided with functionality to configure the PFX interface utility with user preferences as to default actions, default methods of displaying certain objects, etc., in a manner known to those skilled in the art of graphical user interfaces.

In summary, the PFX content consists of personal data items, or data objects, each of which may be protected independently through encryption with a password-based key or a receiver's public key. The data integrity of the entire PFX object as a whole can be optionally ensured by attaching a digital signature (public key integrity mode) or a message digest (password integrity mode).

PFX name field 301 provides the name of the PFX object that is currently being viewed within display 300. If the PFX in the display has been imported from a file, the value in this field is the file the PFX was read from. If the PFX in the display is under construction, the value in this field is the file the PFX will be written to when it is exported from the interface.

Version field 302 is the syntax version number for the PFX object being displayed within display 300. As the standards for PFX objects changes over time, various applications may create PFX objects in accordance with different versions of the standard. The version number is stored within the PFX object so that an application may know by which version of the standard the PFX object should be parsed, interpreted, or decoded.

Data integrity mode field 303 identifies the type of data integrity protection used with the PFX object, i.e. password integrity mode, public key integrity mode or none. If some form of data integrity protection has been employed, the data integrity mode field 303 also indicates whether the contents of the PFX object have been verified. Any data contents of a PFX object are hidden until the PFX object is verified.

If the PFX object uses public key integrity mode, the data integrity can be verified by dragging and dropping an appropriate public key object 309 onto the data integrity mode field 303. If the PFX uses password integrity mode, an appropriate password may be entered in order to perform verification of the PFX object. If no data integrity mode is used, the user need not verify the contents before viewing them.

Although FIG. 3 shows the data integrity mode field 303 as a header type field, the invention is not limited to such a display. Rather, the data integrity mode field may be displayed as a selectable icon that can accept a password or key input and change appearance if the data integrity is successfully verified by the input.

Elements of a PFX object are grouped by type into areas of the display 300 so that the user may visually grasp associated elements and their relationships. The user can drag and drop an object, such as a text file containing an encoded certificate, onto content area 350 of the dialog to update the contents with a new value.

The elements may be linked to one another in accordance with defined relationships. For example, as will be discussed in greater detail hereafter, certificate objects may be linked to private key objects, certificate revocation lists and/or other certificates. EncryptedData objects and EnvelopedData objects are not themselves linked to any other objects in the PFX object although their contents may be once the EncryptedData and EvelopedData objects are decrypted. Other defined relationships may be used with the present invention without departing from the spirit and scope of the present invention.

The relationships between the various elements of the PFX object may be discerned by the graphical user interface with no interaction needed from the user. For example, the private key associated with the public key contained in a certificate object may be determined by encrypting some known text with the public key and decrypting that text with an associated private key. A successful decryption operation thereby discerns the private key/public key pair. Certificate chains can be determined, for example, by extracting the issuer information from the certificate object and determining if the issuer information is the subject of another certificate. If so, the certificates are part of a chain of certificates.

Similarly, the certificates associated with a certificate revocation list may be determined by examining the serial number present in the objects. If the serial number in a certificate matches the serial number specified by a certificate revocation list, the two objects are related. Other methods of automatically determining the relationships between PFX object elements may be used without departing from the spirit and scope of the present invention.

Private key objects 310 and 311 are shown on the first layer of the content area 350 with graphical depictions of their associations with certificate objects 321–324. When a PFX object is imported and verified, the private keys associated with the PFX object are displayed as private key objects in the content area 350. When constructing a PFX object, a user can add a private key to the PFX object by dragging and dropping a private key object onto the content area 350 from, for example, a toolbar, menu, or other graphical user interface tool.

The details of the private key objects 310 and 311, as with any of the objects in the graphical user interface that have been decrypted, may be viewed and edited by selecting the object. When the object is selected, a display of the object details may be displayed, for example, as a graphical user interface, through which the object details may be edited. Thus, the data of a data object may be manipulated by selecting the object and editing the data of the data object. The edited data may then be stored as part of the PFX object.

Certificate objects 321–324 are shown grouped within a second layer of the content area 350 of the display 300. This set of certificates may be used to help the recipient of the PFX object to identify the public key that will be needed to verify the contents of the PFX object. The certificates will typically be in a certificate chain order, however a chain of certificates is not necessary for the functioning of the present invention. Arrows between certificates represent certificate chains that exist within the PFX object, and arrow 325 between the certificate objects 321 and 323, for example, shows the order from the entry level to the root certificate authority. More than one chain can be present, and not all certificates in the chain need to be present.

In addition, a certificate may hold the public key counterpart to a private key object existing in the PFX object. In that case, an arrow 327 or 328 between the private key and the certificate indicates this relationship. The graphical user interface can detect this relationship in a straightforward manner. For example, if a known plain text object is encrypted with a private key and successfully decrypted by a public key (or vice versa), the keys compose a key pair.

If constructing a PFX object, the user can add certificates to the PFX object by dragging and dropping the certificate object on the content area 350 from, for example, a toolbar, menu, or similar graphical user interface tool. The graphical user interface will then add the certificate to the PFX object. If desired by the user, the interface can automatically import the certificates from a configured certificate database to construct the certificate chain for the user after the certificate has been added.

The user can select a certificate object and open a separate graphical interface to view and manipulate the attributes contained within the selected certificate object.

Certificate Revocation List (CRL) object 330 is shown within an area of display 300 that is reserved for CRLs. The CRL shown in display 300 is used to help the recipient of the PFX object to identify which certificates should be flagged as invalid. Arrows between a CRL and a certificate object indicate which certificate has been revoked by a particular CRL, and arrow 331 indicates that certificate 323 has been revoked as indicated within CRL object 330. If optionally configured by the user, the interface utility will consult a Lightweight Directory Access Protocol (LDAP) database and use the X.509 names in the certificate and CRL objects to determine which certificates should be revoked.

The user can add CRLs to the PFX object by dragging and dropping the CRL object on the CRL visual area. The interface utility will add the CRL to the PFX object. The user can also select a CRL object and open a separate visual interface or dialog window to view and manipulate the attributes contained within the selected CRL object, e.g., by double-clicking on a CRL object.

Encrypted data objects 340–341 are shown in an area of the content area 350 of the display 300 set aside for encrypted data objects. Individual data items contained within the PFX may be independently protected via encryption with a password-based key and the data items can be decrypted at the destination by providing the necessary password. Until the decryption takes place, however, the data items are displayed as opaque objects and password protected data is recognized as a PKCS #7 EncryptedData object.

A user can decrypt EncryptedData objects by selecting an EncryptedData object and providing a password. The contents of any EncryptedData object decryptable by that password will then be accessible and put into the proper category of object, i.e. private key object, certificate object, CRL object, and the like. The opaque objects that were decrypted are then removed from the EncryptedData object area. The EncryptedData objects that are not decryptable by the provided password remain as opaque objects in the EncryptedData area.

EnvelopedData object 348 is shown in an area of the content area 350 of the display 300 set aside for EnvelopedData objects. Individual data items contained within the PFX object may be independently protected via encryption with the public key of the PFX object receiver and the data items can be decrypted at the destination by providing the necessary private key. Until the decryption takes place, however, the data items are displayed as opaque EnvelopedData objects. These data items are recognized as public key protected PKCS #7 EnvelopedData objects.

The user can decrypt EnvelopedData objects by dragging and dropping a private key on the content area 350. The contents of any EnvelopedData object decryptable by the private key will then be accessible and put into the proper category of object, i.e. private key object, certificate object, CRL object, and the like. The opaque objects that were decrypted are removed from the EnvelopedData object area while those that were not decrypted remain in the EnvelopedData object area.

The contents of the PFX object may be protected by many different public keys. Thus, the user would need to provide as many private keys as necessary to decrypt all the EnvelopedData objects.

It should be noted that there are no relationship designators between the EncryptedData objects/EnvelopedData objects and the other PFX object contents. This is because the contents of the protected data objects are not known until they are decrypted with either an appropriate password or private key. Once decrypted, the protected data objects are replaced with objects corresponding to the decrypted contents.

Existing PFX objects could be dragged and dropped onto the interface to view a preconstructed PFX object. The interface could also export a PFX object that passes validation to a file or other transfer mechanism, such as the clipboard, in a DER-encoded format. Before the PFX object is exported or stored, the interface will run the defined elements through a set of verification rules, presenting errors to the user if present. The same validation checks will also occur when a PFX object is imported into the interface.

Send button 361 allows the user to send the PFX object to previously specified e-mail addresses in a MIME message in which the PFX object is encoded in BASE64 format. The sender should wrap the message in a Simple Mail Transport Protocol (SMTP).

Import button 342 allows the user to import a PFX object from a specified DER-encoded file and populate the display objects. Export button 344 allows the user to store the PFX object in a DER-encoded file. Protect button 343 is used to provide data privacy. The user selects one or more data items, and then selects the Protect button 343 in order to protect the data items with a password or receiver's public key. The Protect button is also used to provide data integrity for the PFX, using password-based mode or public key mode. To do this, the user would select the Protect button without having selected any data items, and then provides a password or private key.

With reference now to the elements shown in FIG. 3, the various functions for creating, storing and modifying a PFX object will now be described.

Importing a PFX Object

Typically, a DER encoded PFX object is received from a sender and stored into a file on the receiver device. When the user selects the Import button 342, the user is prompted for a filename. Once the user enters an appropriate filename, the DER encoding in the file is parsed into the component PFX objects and displayed. If there is an input/output error accessing the file or the file does not contain valid DER encoding of a PFX object, an error pop-up display is displayed.

The graphical user interface displays the filename of the file from which the PFX object was imported, the version number and the integrity mode of the imported PFX. Once a PFX object has been imported, the Import button 342 is disabled (made not selectable).

Verifying PFX Object Contents

Once a PFX object has been imported, the type of data integrity mode of the PFX object is shown. This mode will be one of "none," "password," and "public key." If the mode is "none," any data that is not privacy protected will be displayed in the appropriate areas of the content area 350. Data objects will be displayed as icons distinct to their data type and will be labeled with the "Friendly Name" attribute attached to the data object, if one exists. "Friendly Names" are discussed in more detail hereafter.

Data objects that are privacy protected will be displayed either in the EncryptedData area if they are protected with password-based privacy, or in the EnvelopedData area if they are protected with public-key privacy.

If the data integrity mode is "password" or "public key," the user will be prompted for a password or public key. To verify data integrity in the "password" mode, the user provides the password at the prompt. The password is used to generate a key used to generate a message digest on the PFX object contents. This message digest is compared to a message digest attached to the imported PFX object.

If the message digests match, the integrity mode field indicates "Verified" and any data objects that are unprotected or privacy protected by the same password that was entered for verification will be shown in their appropriate area of the content area 350. Any protected data objects that are not decryptable with the entered password will be shown as either EncryptedData or EnvelopedData objects. If the verification fails, an error pop-up display is displayed.

If the data integrity is "public key" mode, the user, at the prompt, provides information, such as a filename or database name, indicating where a certificate containing a public key can be found. Alternatively, the user may drag and drop a certificate or public key object onto the integrity mode field or prompt display. If the digital signature is verified, the integrity mode field indicates "Verified." Once the data integrity is verified, any data items that are unprotected will be shown in their appropriate areas of the content area 350. Any protected data items will be shown as EncryptedData or EnvelopedData objects. If the verification fails, an error pop-up display will be displayed.

Once the data integrity has been verified and individual data objects are present in the content area 350, the Protect and Export buttons are enabled.

Decrypting Protected Data Items

After verifying the data integrity of an imported PFX, there may be data objects that are displayed as EncryptedData or EnvelopedData objects. These data objects must be decrypted at the receiver to extract the personal information packaged within them.

In order to decrypt EncryptedData objects, the user selects an EncryptedData object and is prompted for a password. If the password entered is correct, the contents of the decrypted EncryptedData object is displayed in the appropriate area of the content area 350. The PFX interface utility will then attempt to decrypt any other EncryptedData objects present as well. Those EncryptedData objects that are decryptable with the same password will be decrypted and their contents displayed in the appropriate areas of the content area 350. Those that are not decryptable with the same password, will remain in the EncryptedData area.

In order to decrypt EnvelopedData objects, the user drags and drops a private key object onto an EnvelopedData object. If the key can successfully decrypt the content, the content is extracted and displayed in the appropriate areas of the content area 350. Thereafter, the PFX interface utility will attempt to decrypt any other EnvelopedData objects present as well. Those EnvelopedData objects that are decryptable with the same private key will be decrypted and their contents displayed in the appropriate areas of the content area 350. Those that are not decryptable with the same private key, will remain in the EnvelopedData area.

Once a data object is decrypted and extracted, the user may view it using a graphical interface. For example, the user may double-click a data object to bring up a secondary graphical interface to view the data object. The secondary graphical interface may be tailored to the particular data object being viewed.

Constructing a PFX

To construct a new PFX object from separate data objects, the user initiates the PFX interface utility which displays the graphical user interface. The user then drags and drops data objects into the content area 350. The data objects may be optionally protected with password based or public key encryption by selecting the data object, selecting the Protect button, and then entering an appropriate password or public key information.

Thereafter, the user may optionally protect the data integrity of the PFX object contents by selecting the Protect button (with no data items selected), and then entering an appropriate password or private key information. The Integrity Mode field of the interface will indicate which mode has been used based on whether the user protected with a password or private key. Once the PFX object contents are compiled, the user may select the Export button to save the newly constructed PFX object to a file. If a filename has not been previously designated, the selection of the Export button may be followed by a prompt for the user to enter a filename.

A newly initiated PFX interface utility will display "3" in the version field, "none" in the integrity mode field and an empty content area 350 where the data objects will be added. The Import button will be enabled but both the Protect and Export buttons will be disabled until data objects are added to the content area 350.

Adding Data Objects to Content Area

Once the PFX interface utility has been invoked and the graphical user interface is displayed, the user can drag and drop individual data objects onto the content area 350 where they will appear as private key, certificate or certificate revocation list icons. The PFX interface utility determines relationships between objects as they are added and displays those relationships as arrows or some other relationship indicator.

The PKCS #12 standard describes optional attributes that can be added to objects contained within a PFX object. One of these attributes, called a "Friendly Name" is simply a user-friendly string describing the data object (for example, "John Doe's Certificate"). When an object is added to the content area 350, the user can select an Add Friendly Name action, for example from a pop-up menu in response to right-clicking on the object, to assign a Friendly Name value. The object icon will be labeled with the value assigned. If no Friendly Name is assigned, a default label will be used.

Another optional attribute that can be added to objects is called a "Local Key ID" which is an arbitrary sequence of bytes used as a data identifier. Although the Local Key ID is optional, in practice it is commonly used to couple a private key to the certificate containing the corresponding public key. That is, associated private keys and certificates are required to have the same Local Key ID. CRLs are not required to have the same Local Key ID as their associated certificates, and certificates within a chain are not required to have the same Local Key ID.

Every object added to the PFX object will be assigned a Local Key ID. When a new private key is added, the PFX interface utility will determine if it is coupled to an existing certificate. If it is, the private key will be assigned the Local Key ID already assigned to the certificate. If not, the object will be assigned a new Local Key ID. When a certificate is added, the PFX interface utility will determine if it is coupled to an existing private key. If it is, the certificate will be assigned the Local Key ID already assigned to the private key. If not, the certificate will get a new Local Key ID.

The Integrity Mode field is set to "none" to indicate that the current PFX object contents have neither been verified nor protected. As soon as any data items are added to the visual area, the Protect and Export buttons are enabled.

Removing Data Items from the Content Area

Objects can also be removed from the content area 350. The user can remove objects by selecting one or more objects and then deleting them by some means, such as pressing a Delete key or right clicking and then choosing a Delete action. When an object is deleted, its icon is removed from the content area 350. Any relationship indicators connecting it to other objects are also removed. Data items associated with a removed data object may not be removed themselves; for example, removing a certificate from a PFX may not result in the removal of the associated private key.

When objects are removed from the content area 350, the integrity mode field is set to "none" to indicate that the current PFX object contents have neither been verified nor protected.

Providing PFX Object Data Privacy

Once the objects have been added to the content area 350, data privacy can be provided with password-based or public-key encryption. To protect the data, the user selects one or more objects, and then selects the Protect button. The user then provides a password or information where the receiver's public key can be found (for example, a filename or database name). The PFX interface utility encrypts the object(s) with the appropriate key and the encrypted items are then displayed, not as the original icons, but as EncryptedData (for password-based encryption) or EnvelopedData (for public-key encryption). Any relationship indicators associated with the original unprotected data will be removed.

The user can encrypt all, some or none of the data. Moreover, the encryption can be a combination of password-based and public-key encryption, using a variety of passwords and/or public keys. It is important to note that, in practice, common applications do not support all the data privacy and integrity modes defined in the PKCS #12 standard. Many applications expect that PFX object data is protected only with password-based encryption, and that the same password is used for all data privacy as well as data integrity. While this invention could be limited to provide only password-based data protection, it favors the flexibility of the PKCS #12 standard. It is up to the user to use the features in such a way to create PFX objects compatible with the common PFX applications, such as Web browsers, if that is a necessity.

Once again, the contents of the PFX object has changed, so the integrity mode field is set to "none" to indicate that the current PFX object contents have neither been verified nor protected.

Providing PFX Object Data Integrity

Once the data has been protected satisfactorily, the user can provide data integrity protection by attaching a message digest or digital signature to the PFX object. To do this, the user selects the Protect button at the bottom of the interface without having selected any data items. The user then provides a password (if password-based data integrity mode is used) or a private key (if public-key data integrity mode is used). Once the data has been protected, the integrity mode field at the top of the interface changes from "none" to "password" or "public key", as appropriate to indicate the current contents of the PFX have been digested or signed.

If any changes are made to the PFX object contents after the protect operation (for example, data objects are added or removed, or unprotected data is protected), the integrity mode field will be reset to "none". The user must select the Protect button again to protect the revised contents.

Exporting a PFX Object

Once all the data has been added and protected with data privacy and integrity operations, the PFX object can be DER-encoded and saved to a file. To do this, the user selects the Export button at the bottom of the graphical user interface and is prompted for a filename. The PFX is DER-encoded and written to that file. If any I/O errors are encountered, an error pop-up is displayed. The encoded PFX object can then be used as a secure, standard transmission vehicle for the personal information stored within it.

Figure 4B:
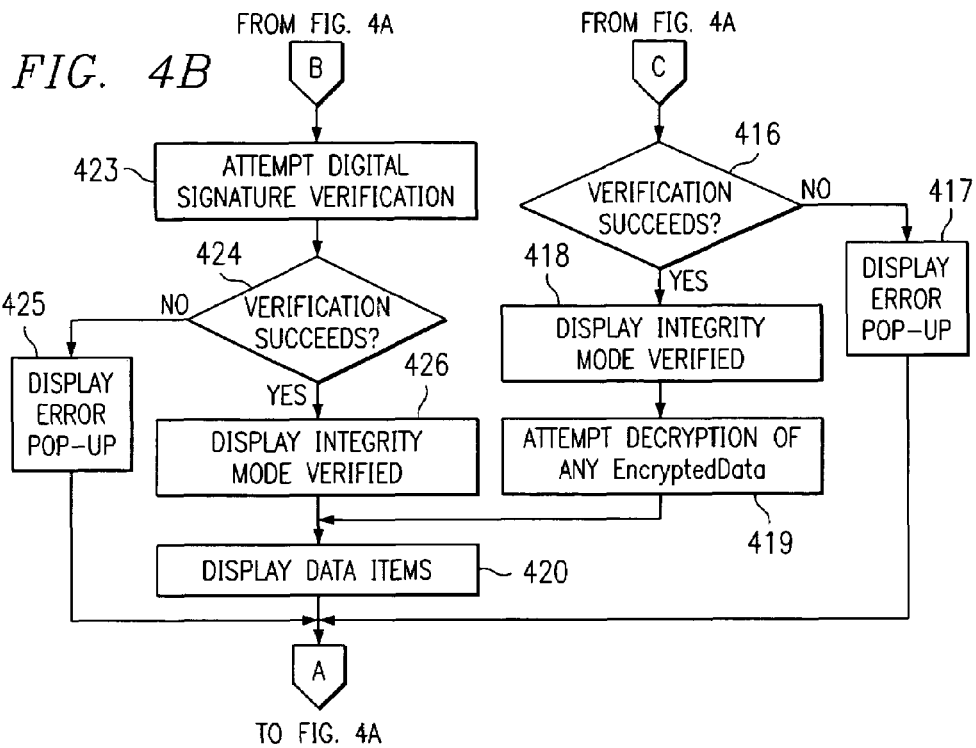

With reference now to FIGS. 4A and 4B, a flowchart depicts the processes of importing a PFX object and verifying the PFX object contents within an PFX interface utility for viewing and manipulating PFX objects, such as the PFX object shown in FIG. 3, in accordance with a preferred embodiment of the present invention. As shown in FIG. 4, the process begins by waiting for a user action (step 401). In essence, the flowchart shows a main event loop for processing events within a graphical user interface. The process sits in the event loop monitoring for a user action, processing the user action, and then returning to monitor for additional user actions.

A determination is then made as to whether the user has selected an import function, such as by selection of an Import button, or not (step 402). If so, then the user is prompted to enter a filename of the PFX object to be imported and the file corresponding to the entered filename is then read (step 403). If not, then the user has selected another function to be performed, and the selected function is performed (step 402-1) in accordance with the flowcharts shown in FIGS. 5–11.

A determination is made as to whether the file was read successfully (step 404). If not, then an error pop-up display is displayed (step 404-1). If so, the PFX object file is decoded (step 405). A determination is then made as to whether or not the decoding operation was performed successfully (step 406). If not, an error pop-up display is displayed (step 407) and the process returns to step 401. If so, the PFX object information is displayed, such as filename, version and integrity mode (step 408).

A determination is made as to whether the integrity mode is "none" or not (step 410). If so, the objects within the PFX object are displayed (step 411) and the process returns to step 401.

If not, a determination is made as to whether the integrity mode is "password" or not (step 413). If so, a password prompt is displayed (step 414). Once a password is entered, a message digest verification is attempted (step 415). A determination is then made as to whether the verification was successful or not (step 416). If not, an error pop-up display is displayed (step 417) and the process returns to step 401. If so, the integrity mode is changed to "Verified" (step 418) and decryption of the EncryptedData objects is attempted (step 419).

Thereafter, the decrypted objects are displayed (step 420). The process then returns to step 401 to wait for further user action.

If the integrity mode is not "password" (step 413), the user is prompted to enter a public key of the sender (step 422). Thereafter, a digital signature verification is attempted (step 423). A determination is then made as to whether or not the digital signature verification was successful (step 424). If not, an error pop-up display is displayed (step 425) and the process returns to step 401. If so, the integrity mode if changed to read "Verified" (step 426). The process then continues to step 420.

FIG. 5 is a flowchart outlining an exemplary operation of the present invention when displaying data objects and decrypting data objects. As shown in FIG. 5, the operation starts from step 402-1 in FIG. 4, and a determination is made as to whether the user selected a data object (step 501). If the user selected a data object, the contents of the data object are displayed in a graphical user interface that may be tailored to the particular data object selected (step 502). The operation then returns to step 401 of FIG. 4.

If the user did not select a data object, a determination is made as to whether or not the user selected an EncryptedData object (step 503). If so, the user is prompted to enter a password to decrypt the selected EncryptedData object (step 504). Thereafter, decryption of the EncryptedData object is attempted (step 505). A determination is made as to whether or not the decryption attempt was successful (step 506). If so, the contents of the EncryptedData object are displayed (step 507). Displayed object relationships are then determined (step 508) and the EncryptedData object is removed from the display (step 509).

Thereafter, or if the decryption attempt was unsuccessful in step 506, a determination is made as to whether there are more EncryptedData objects in the display (step 510). If so, the next EncryptedData object is selected (step 511) and the operation returns to step 504. If not, the operation returns to step 401 of Figure 4.

If in step 503 the user does not select an EncryptedData object, a determination is made as to whether or not the user selected an EnvelopedData object (step 512). If not, the operation returns to step 401 of FIG. 4. If so, the user is prompted to enter the location and name of a private key for decrypting the EnvelopedData object (step 513). Thereafter, decryption of the EnvelopedData object is attempted using the information entered about the private key (step 514).

A determination is then made as to whether or not the decryption attempt was successful or not (step 515). If so, the content of the EnvelopedData object is extracted and displayed (step 516). Then, the relationships between the extracted content and other data items are determined (step 517) and the EnvelopedData object is removed from the display (step 518).

Thereafter, or if the decryption attempt was unsuccessful in step 515, a determination is made as to whether or not there are additional EnvelopedData objects (step 519). If not, the operation returns to step 401 in FIG. 4. If so, the next EnvelopedData object is selected (step 520) and the operation returns to step 514.

Figure 6A:
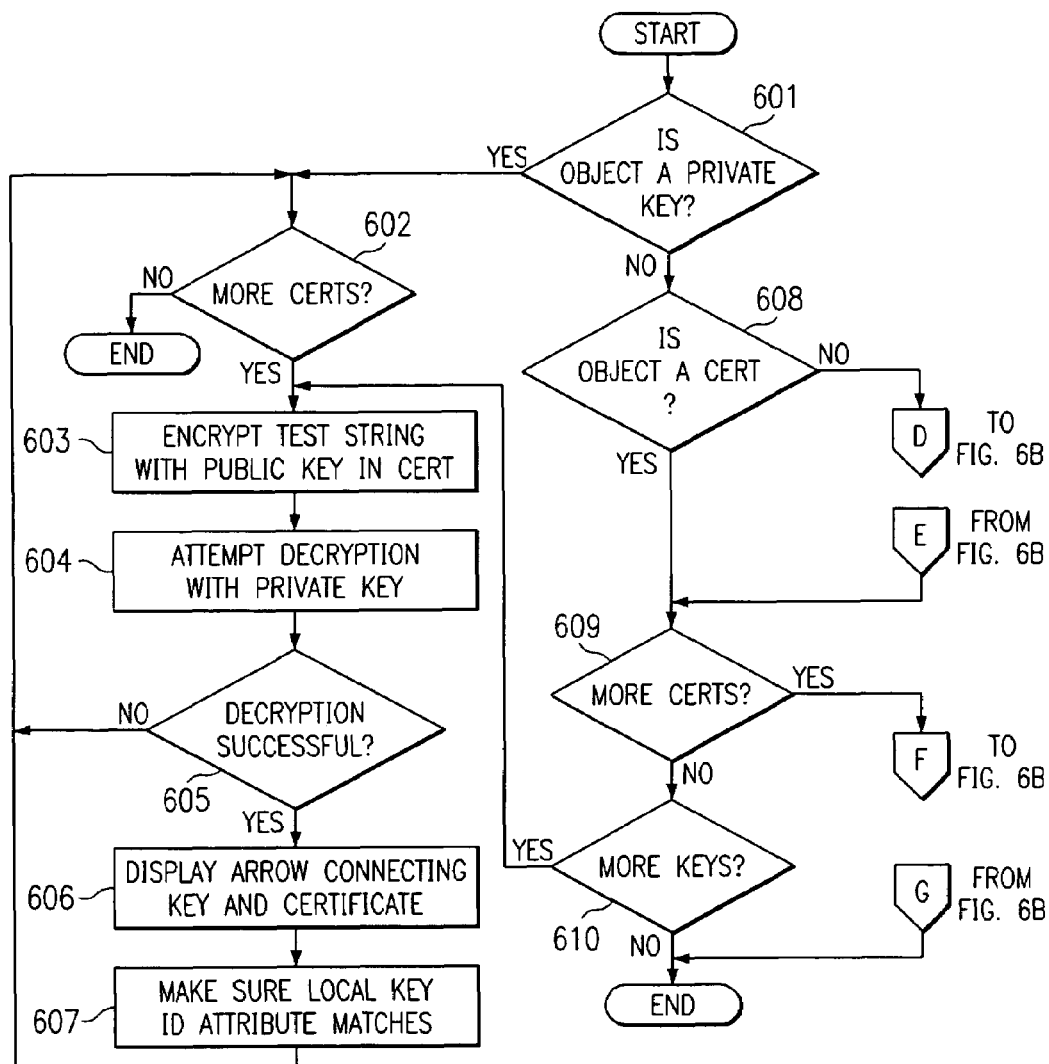
FIGS. 6A and 6B is a flowchart outlining an exemplary operation of the present invention when determining data object relationships.
Figure 6B:
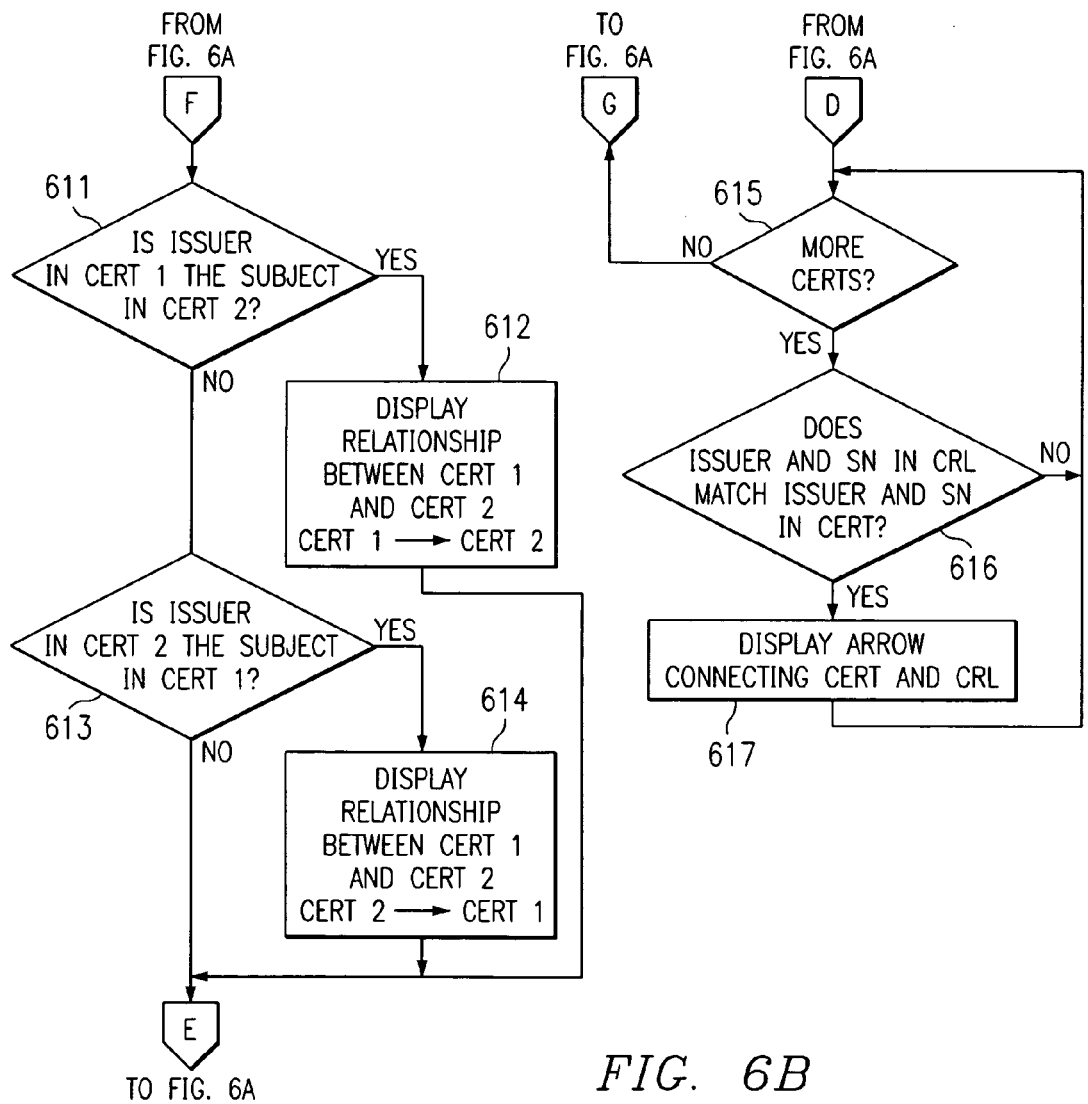

FIG. 6A and 6B is a flowchart outlining an exemplary operation of the present invention when determining data object relationships. As shown in FIG. 6, the operation starts with a determination as to whether or not the object is a private key (step 601). If so, a determination is made as to whether there are more certificates in the PFX object (step 602). If not, the operation ends. If so, a test string is encrypted with the public key in the certificate (step 603) and decryption of the object with the private key is attempted (step 604).

A determination is then made as to whether or not the decryption attempt was successful (step 605). If so, a relationship indicator is displayed indicating the relationship between the private key and the certificate (step 606). It is then verified that the Local Key ID attributes match (step 607). Thereafter, or if decryption is not successful in step 605, the operation returns to step 602.

If in step 601 the object is not a private key object, a determination is made as to whether the object is a certificate object (step 608). If so, a determination is made as to whether there are more certificates (step 609). If not, a determination is made as to whether there are more keys (step 610). If not, the operation ends. Otherwise, the operation goes to step 603.

If there are more certificates in step 609, a determination is made as to whether or not the issuer in the certificate 1 is the subject in certificate 2 (step 611). If so, a relationship indicator is displayed between certificate 2 and certificate 1 (step 612). If not, a determination is made as to whether or not the issuer in certificate 2 is the subject in certificate 1 (step 613). If so, a relationship indicator is displayed between certificate 2 and certificate 1 (step 614). After steps 612 and 614, or if the issuer in certificate 2 is not the subject in certificate 1 in step 613, the operation returns to step 609.

If in step 608, the object is not a certificate object, the object must be a CRL object and a determination is made as to whether there are more certificates (step 615). If not, the operation ends. If so, a determination is made as to whether the issuer and serial number in the CRL matches the issuer and serial number in the certificate (step 616). If not, the operation returns to step 615. If so, a relationship indicator between the certificate object and the CRL object is displayed (step 617). Thereafter, the operation returns to step 615.

Figure 7:
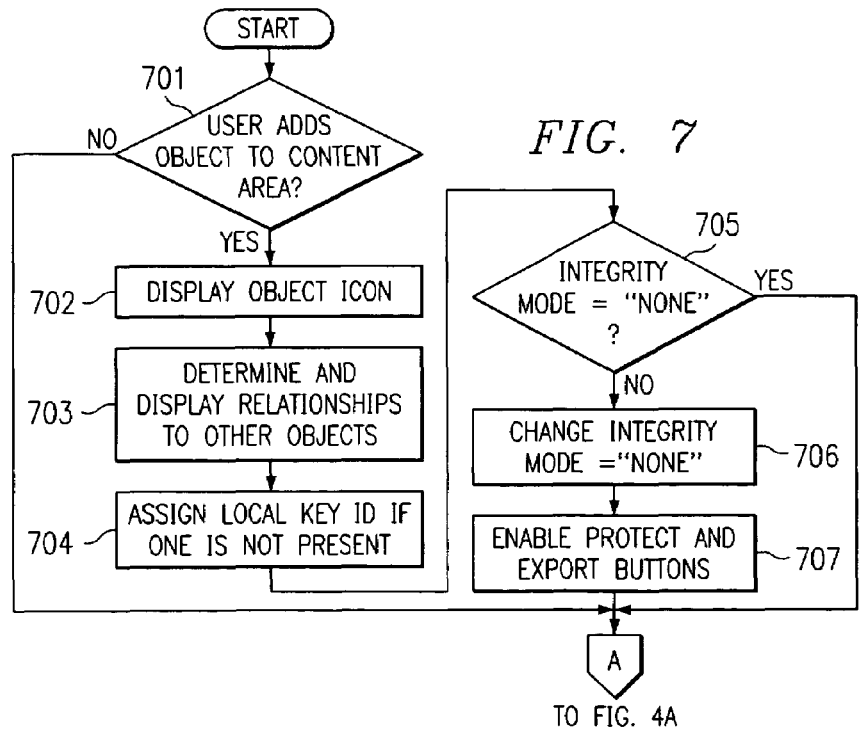
FIG. 7 is a flowchart outlining an exemplary operation of the present invention when adding data objects to a PFX object.

FIG. 7 is a flowchart outlining an exemplary operation of the present invention when adding data objects during construction of a PFX object. As shown in FIG. 7, the operation starts with a determination as to whether or not the user adds an object to the content area (step 701). If not, the operation returns to step 401 in FIG. 4A. If so, the object icon is displayed (step 702) and the relationships between the added object and the other objects is determined (step 703). Thereafter, a Local Key ID is assigned if one is not present (step 704) and a determination is made as to whether or not the integrity mode is "none" (step 705). If so, the operation returns to step 401 in FIG. 4A. If not, the integrity mode is changed to "none" (step 706) and the Protect and Export buttons are enabled (step 707). The operation then returns to step 401 in FIG. 4A.

FIG. 8 is a flowchart outlining an exemplary operation of the present invention when removing data objects from a PFX object. As shown in FIG. 8, the operation starts with a determination as to whether or not the user deletes an object from the content area of the PFX object (step 801). If not, the operation returns to step 401 of FIG. 4A. If so, the relationship indicators associated with the removed object are removed from the display (step 802). The object icon is then removed (step 803) and a determination is made as to whether or not the integrity mode is "none" or not (step 804). If so, the operation returns to step 401 in FIG. 4A. If not, the integrity mode is changed to "none" (step 805). A determination is then made as to whether there are more data items in the display (step 806). If so, the operation returns to step 401 in FIG. 4A. If not, the Protect and Export buttons are disabled (step 807), and the operation then returns to step 401 in FIG. 4A.

FIG. 9 is a flowchart outlining an exemplary operation of the present invention when protecting PFX object data privacy, i.e. encrypting data objects within the PFX object. As shown in FIG. 9, the operation starts with a determination as to whether or not the user selects a private key, certificate, or CRL object using the PFX interface utility (step 901). If not, the operation goes to step 401 in FIG. 4A. If so, a determination is made as to whether or not the user selects the Protect button (step 902).

If the user does not select the Protect button, the operation goes to step 401 of FIG. 4A. If the user does select the Protect button, the user is prompted for either a password or the receiver's public key (step 903). Then, a determination is made as to whether the user provided a password (step 904). If so, a key is generated from the password (step 905)

and the selected data object is encrypted and packaged into an EncryptedData object (step 906). The EncryptedData object is then displayed and the original data object icon is removed along with any relationship indicators associated with the original data object (step 907).

If the user did not provide a password in step 904, the user must have provided the receiver's public key and thus, the selected data object is encrypted and packaged into an EnvelopedData object using the receiver's public key (step 908). The EnvelopedData object is then displayed and the original data object icon is removed along with any associated relationship indicators (step 909). Thereafter, and after step 907, the integrity mode of the PFX object is set to "none" (step 910). The operation then ends.

Figure 10:
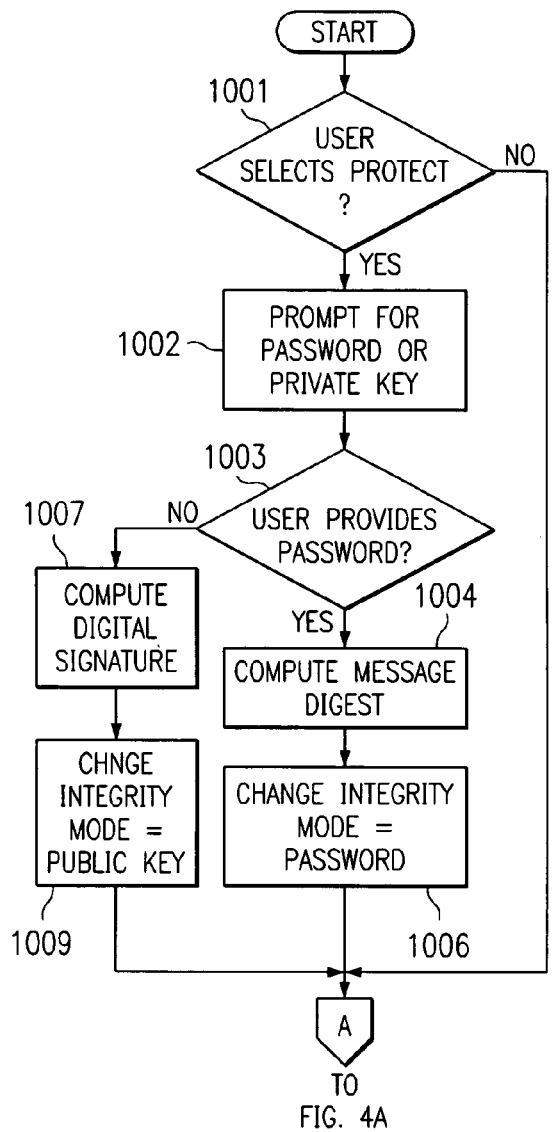
FIG. 10 is a flowchart outlining an exemplary operation of the present invention when providing PFX object data integrity.

FIG. 10 is a flowchart outlining an exemplary operation of the present invention when providing PFX object data integrity protection. As shown in FIG. 10, the operation starts with a determination of whether or not the user selects a protect function by, for example, selecting the Protect button on the graphical user interface (step 1001). If not, the operation goes to step 401 in FIG. 4A. If so, the user is prompted to enter a password or location and name of a private key (step 1002).

Thereafter, a determination is made as to whether the user entered a password (step 1003). If the user entered a password, a message digest is created (step 1004), and the Integrity Mode field of the graphical user interface is changed to "password" (step 1006). The operation then goes to step 401 in FIG. 4.

If the user did not enter a password in step 1003, the user must have entered a private key and a digital signature is then created (step 1007). The Integrity Mode field is changed to "public key" (step 1009) and the operation returns to step 401 in FIG. 4A.

Figure 11:
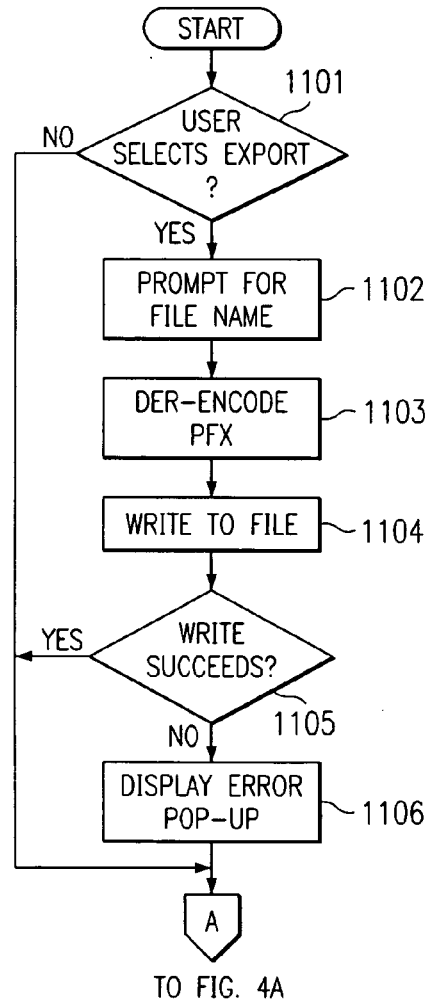
FIG. 11 is a flowchart outlining an exemplary operation of the present invention when exporting a PFX object.

FIG. 11 is a flowchart outlining an exemplary operation of the present invention when exporting a PFX object. As shown in FIG. 11, the operation starts with a determination as to whether or not the user selects an export operation by, for example, selecting the Export button on the graphical user interface (step 1101). If not, the operation returns to step 401 in FIG. 4A. If so, the user is prompted for a filename (step 1102).

Once the user enters a filename, the PFX object is DER encoded (step 1103) and written to a file having the entered filename (step 1104). A determination is then made as to whether the write operation was successful or not (step 1105). If not, an error pop-up message is displayed (step 1106). Thereafter, or if the write operation is successful, the operation returns to step 401 in FIG. 4A.

Thus, the present invention provides a system, apparatus and method for presenting and manipulating PFX objects. The present invention provides a PFX interface utility having a graphical user interface that is easily understood and operated by a user to import, create, and export PFX objects.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system, comprising:
receiving a cryptographic data object formatted according to a syntax for the secure transfer of personal identity information and containing a plurality of data items;
displaying the plurality of data items in a graphical user interface, including an identification of a type of data object for each data item within said cryptographic data object that is a key, a shrouded key, a certificate, a certificate revocation list, or a secret;
providing graphical indicators of relationships between the plurality of data items displayed in the graphical user interface; and
responsive to a user input manipulating a data item within the plurality of data items, modifying the data item.

2. The method of claim 1, wherein the data items include a private key or a public key.

3. The method of claim 1 further comprising:
displaying a graphical control, wherein the graphical control identifies an operation which is performed on a data item within the plurality of data items in response to a selected user input involving the graphical control.

4. The method of claim 1, wherein the displaying step comprises:
displaying an indication of whether a data item within the plurality of data items has been verified.

5. The method of claim 4 further comprising:
displaying a graphical control; and
responsive to a selection of the data item and to a manipulation of the graphical control, performing a verification operation on the data item.

6. The method of claim 1, wherein the plurality of data items includes a version number, an integrity number, and personal data.

7. A method for processing Personal Information Exchange Syntax (PFX) objects in a data processing system comprising a display, the method comprising the computer-implemented steps of:
obtaining an PFX object, wherein the PFX object comprises one or more data objects and at least one encryption key object;
determining data objects contained within the PFX object;
determining logical, associations between, data objects contained within the PFX object;
displaying the PFX object, wherein data objects contained within the PFX object are represented by graphical objects that include an identification of a type of data object for each data object within said PFX object that is a key, a shrouded key, a certificate, a certificate revocation list, or a secret;
displaying visual indicators representing the logical associations between data objects contained within the PFX object; and
modifying the PFX object through processing of user actions within a graphical user interface.

8. The method of claim 7 wherein the PFX object is formatted according to PKCS (Private Key Cryptography Standard) #12.

9. The method of claim 7 wherein the step of modifying the PFX object further comprises:
   selecting a graphical object representing a data object contained within the PFX object;
   displaying data values of the selected data object;
   editing the data values of the selected data object; and
   storing the data values of the selected data object in the PFX object.

10. The method of claim 9 further comprising:
    identifying a data type of the data object represented by the selected graphical object; and
    identifying a default editor for displaying the selected graphical object according to the identified data type of the data object represented by the selected graphical object.

11. The method of claim 7 wherein the step of modifying the PFX object further comprises:
    selecting a graphical object representing a data object contained within the PFX object;
    receiving a user action on the selected graphical object representing a deletion request; and
    deleting from the PFX object the data object represented by the selected graphical object.

12. The method of claim 11 further comprising:
    determining whether the selected graphical object represents a certificate object;
    in response to a determination that the selected graphical object represents a certificate object:
    determining whether the certificate object is logically associated with a different certificate object embedded within the PFX object; and
    in response to a determination that the certificate object is logically associated with a different certificate object embedded within the PFX object, removing a visual indicator representing a logical association between the certificate object and the different certificate object;
    determining whether the certificate object is logically associated with a private key object;
    in response to a determination that the certificate object is logically associated with a private key object:
    removing a visual indicator representing a logical association between the certificate object and the private key object.

13. The method of claim 11 further comprising:
    determining whether the selected graphical object represents a certificate revocation list object;
    in response to a determination that the selected graphical object represents a certificate revocation list object:
    determining whether the certificate revocation list object is logically associated with a certificate object; and
    in response to a determination that the certificate revocation list object is logically associated with a certificate object, removing a visual indicator representing a logical association between the certificate object and the certificate revocation list object.

14. The method of claim 7, wherein the step of modifying the PFX object further comprises:
    selecting a graphical object representing a data object contained within the PFX object;
    receiving a user action on the selected graphical object representing an action request; and
    performing the action associated with the action request, on the data object represented by the selected graphical object.

15. The method of claim 7 further comprising:
    receiving a user request to export the PFX object;
    obtaining a user-specified filename; and
    storing the PFX object in DER-encoded format in a file having the user-specified filename.

16. The method of claim 7 further comprising:
    receiving a user request to import the PFX object;
    obtaining a user-specified filename; importing the PFX object in DER-encoded format from a file having the user-specified filename; and
    displaying graphical objects representing data objects contained within the PFX object.

17. The method of claim 7 further comprising:
    receiving a user request to add a data object to the PFX object;
    determining whether an encryption key data object is embedded in the PFX object;
    in response to a determination that au encryption key data object is not embedded in the PFX object:
    storing the data object within the PFX object;
    displaying a graphical object representing the data object, wherein the graphical object indicates that the data object is embedded within the PFX object;
    in response to a determination that an encryption key data object is embedded in the PFX object:
    generating an encrypted data object within the PFX object; and
    displaying a graphical object representing the encrypted data object, wherein the graphical object indicates that the encrypted data object is embedded within the PFX object.

18. The method of claim 17 further comprising:
    dragging and dropping a graphical object representing the data object on a graphical object representing the PFX object.

19. The method of claim 7 further comprising:
    receiving a user request to add a certificate object to the PFX object;
    storing the certificate object in the PFX object; and
    displaying a graphical object representing the certificate object, wherein the graphical object indicates that the certificate object is embedded within the PFX object.

20. The method of claim 19 further comprising:
    determining whether the certificate object is logically associated with a different certificate object embedded within the PFX object; and
    in response to a determination that the certificate object is logically associated with a different certificate object embedded within the PFX object, displaying a visual indicator representing a logical association between the certificate object and the different certificate object.

21. The method of claim 19 further comprising:
    determining whether an encryption key data object is embedded in the PFX object;
    in response to a determination that an encryption key data object is embedded in the PFX object, receiving user input requesting generation of a data object;
    generating a data object;
    storing the data object in the PFX object; and
    displaying a graphical object representing the data object, wherein the graphical object indicates that the data object is embedded within the PFX object; and
    displaying a visual indicator representing a logical association between the data object and an associated certificate object.

22. The method of claim 19 further comprising:
dragging and dropping a graphical object representing the certificate object on a graphical object representing the PFX object.

23. The method of claim 7 further comprising:
receiving a user request to add a certificate revocation list object to the PFX object;
storing the certificate revocation list object in the PFX object; and
displaying a graphical object representing the certificate revocation list object wherein the graphical object indicates that the certificate revocation list object is embedded within the PFX object.

24. The method of claim 23 further comprising:
determining whether the certificate revocation list object is logically associated with a certificate object embedded within the PFX object; and
in response to a determination that the certificate revocation list object is logically associated with a certificate object embedded within the PFX object, displaying a visual indicator representing a logical association between the certificate revocation list object and the certificate object.

25. The method of claim 23 further comprising:
dragging and dropping a graphical object representing the certificate revocation list object on a graphical object representing the PFX object.

26. The method of claim 7 further comprising:
receiving a user request to encrypt a data object embedded in the PFX object;
generating an encrypted content data object within the PFX object; and
displaying a graphical object representing the encrypted content data object, wherein the graphical object indicates that the encrypted content data object is embedded within the PFX object.

27. The method of claim 7 further comprising:
receiving a user request to decrypt an encrypted content data object embedded in the PFX object;
decrypting the encrypted content data object to a data object embedded in the PFX object; and
displaying a graphical object representing the data object, wherein the graphical object indicates that the data object is embedded within the PFX object.

28. The method of claim 7 further comprising:
receiving a user request to select an encryption key algorithm;
deleting an encryption key embedded in the PFX object; and
removing the encryption key from data objects embedded in the PFX object.

29. A data processing system for processing Personal Information Exchange Syntax (PFX) objects comprising:
obtaining means for obtaining a PFX object, wherein the PFX object comprises at least one data object and at least one encryption key object;
first determining means for determining data objects contained with the PFX object;
second determining means for determining logical associations between data objects contained within the PFX object;
first displaying means for displaying the PFX object, wherein data objects contained within the PFX object are represented by graphical objects which include an identification of type of data object for each data object within said PFX object that is a key, a shrouded key, a certificate, a certificate revocation list, or a secret; and
second displaying means for displaying visual indicators representing the logical associations between data objects contained within the PFX object;
modifying means for modifying the PFX object through processing of user actions within a graphical user interface.

30. The data processing system of claim 29 wherein the PFX object is formatted according to PKCS (Private Key Cryptography Standard) #12.

31. The data processing system of claim 29 wherein the modifying means further comprises:
first selecting means for selecting a graphical object representing a data object contained within the PFX object;
third displaying means for displaying data values of the selected data object;
editing means for editing the data values of the selected data object; and
storing means for storing the data values of the selected data object in the PFX object.

32. The data processing means of claim 31 further comprising:
first identifying means for identifying a data type of the data object represented by the selected graphical object; and
second identifying means for identifying an editor for displaying the selected data object according to the identified data type of the data object represented by the selected graphical object.

33. The data processing system of claim 31, wherein the modifying means flatter comprises:
second selecting means for selecting a graphical object representing a data object contained within the PFX object;
first receiving means for receiving a user action on the selected graphical object representing a deletion request; and
first deleting means for deleting from the PFX object the data object represented by the selected graphical object.

34. The data processing system of claim 32 further comprising:
third determining means for determining whether the selected graphical object represents a certificate object;
fourth determining means for determining, in response to a determination that the selected graphical object represents a certificate object, whether the certificate object is logically associated with a different certificate object embedded within the PFX object;
first removing means for removing, in response to a determination that the certificate object is logically associated with a different certificate object embedded within the PFX object, a visual indicator representing a logical association between the certificate object and the different certificate object;
fifth determining means for determining whether the certificate object is logically associated with a data object;
second deleting means for deleting, in response to a determination that the certificate object is logically associated with a data object, the data object; and
second removing means for removing, in response to a determination that the certificate object is logically associated with a data object, a visual indicator representing a logical association between the certificate object and the data object.

35. The data processing system of claim 33, further comprising:
- sixth determining means for determining whether the selected graphical object represents a certificate revocation list object;
- seventh determining means for determining, in response to a determination that the selected graphical object represents a certificate revocation list object, whether the certificate revocation list object is logically associated with a certificate object; and
- third removing means for removing, in response to a determination that the certificate revocation list object is logically associated with a certificate object, a visual indicator representing a logical association between the certificate object and the certificate revocation list object.

36. The data processing system of claim 31, wherein the modifying means further comprises:
- second selecting means for selecting a graphical object representing a data object contained within the PFX object;
- first receiving means for receiving a user action on the selected graphical object representing an action request; and
- first action means for performing the action associated with the action request, on the data object represented by the selected graphical object.

37. The data processing system of claim 29 further comprising:
- third receiving means for receiving a user request to export the PFX object;
- second obtaining means for obtaining a user-specified filename; and
- first storing means for storing the PFX object in DER-encoded format in a file having the user-specified filename.

38. The data processing system of claim 29 further comprising:
- fourth receiving means for receiving a user request to import the PFX object;
- third obtaining means for obtaining a user-specified filename;
- importing means for importing the PFX object in DER-encoded format from a file having the user-specified filename; and
- display means for displaying the graphical objects representing data objects contained within the PFX object.

39. The data processing system of claim 29 further comprising:
- fifth receiving means for receiving a user request to add a data object to the PFX object;
- eighth determining means for determining whether an encryption key data object is embedded in the PFX object;
- second storing means for storing the data object within the PFX object, in response to a determination that an encryption key data object is not embedded in the PFX object;
- fourth displaying means for displaying a graphical object representing the data object, in response to a determination that an encryption key data object is not embedded in the PFX object, wherein the graphical object indicates that the content data object is embedded within the PFX object;
- first generating means for generating an encrypted content data object within the PFX object, in response to a determination that an encryption key data object is embedded in the PFX object; and
- fifth displaying means for displaying, in response to a determination that an encryption key data object is embedded in the PFX object, a graphical object representing the encrypted data object, wherein the graphical object indicates that the encrypted data object is embedded within the PFX object.

40. The data processing system of claim 39 further comprising;
- first dragging and dropping means for dragging and dropping a graphical object representing the data object on a graphical object representing the PFX object.

41. The data processing system of claim 29 further comprising:
- sixth receiving means for receiving a user request to add a certificate object to the PFX object;
- third storing means for storing the certificate object in the PFX object; and
- sixth displaying means for displaying a graphical object representing the certificate object, wherein the graphical object indicates that the certificate object is embedded within the PFX object.

42. The data processing system of claim 41 further comprising:
- ninth determining means for determining whether the certificate object is logically associated with a different certificate object embedded within the PFX object; and
- seventh displaying means for displaying, in response to a determination that the certificate object is logically associated with a different certificate object embedded within the PFX object, a visual indicator representing a logical association between the certificate object and the different certificate object.

43. The data processing system of claim 41 further comprising:
- tenth determining means for determining whether an encryption key data object is embedded in the PFX object;
- receiving means for receiving, in response to a determination that an encryption key data object is embedded in the PFX object, user input requesting generation of a data object;
- second generating means for generating the data object;
- third storing means for storing the data object in the PFX object; and
- eighth displaying means for displaying a graphical object representing the data object, wherein the graphical object indicates that the data object is embedded within the PFX object; and
- ninth displaying means for displaying a visual indicator representing a logical association between the data object and an associated certificate object.

44. The data processing system of claim 41 further comprising:
- second dragging and dropping means for dragging and dropping a graphical object representing the certificate object on a graphical object representing the PFX object.

45. The data processing system of claim 29 further comprising:
- seventh receiving means for receiving a user request to add a certificate revocation list object to the PFX object;
- third storing means for storing the certificate revocation list object in the PFX object; and tenth displaying means for displaying a graphical object representing the certificate revocation list object, wherein the graphical object indicates that the certificate revocation list object is embedded within the PFX object.

46. The data processing system of claim 45 further comprising:
eleventh determining means for determining whether the certificate revocation List object is logically associated with a certificate object embedded within the PFX object; and
eleventh displaying means for displaying, in response to a determination that the certificate revocation list object is logically associated with a certificate object embedded within the PFX object, a visual indicator representing a logical association between the certificate revocation list object and the certificate object.

47. The data processing system of claim 45 further comprising:
third dragging and dropping means for dragging and dropping a graphical object representing the certificate revocation list object on a graphical object representing the PFX object.

48. The data processing system of claim 29, further comprising:
eighth receiving means for receiving a user request to encrypt a data object embedded in the PFX object;
third generating means for generating an encrypted content data object within the PFX object; and
twelfth displaying means for displaying a graphical object representing the encrypted content data object, wherein the graphical object indicates that the encrypted content data object is embedded within the PFX object.

49. The data processing system of claim 29 further comprising:
ninth receiving means for receiving a user request to decrypt an encrypted content data object embedded in the PFX object;
decrypting means for decrypting the encrypted content data object to a data object embedded in the PFX object;
third enabling means for enabling an encrypt button for encrypting the data object; and
thirteenth displaying means for displaying a graphical object representing the data object, wherein the graphical object indicates that the data object is embedded within the PFX object.

50. The data processing system of claim 29 further comprising:
tenth receiving means for receiving a user request to select an encryption key algorithm;
third deleting means for deleting au encryption key object embedded in the PFX object; and
fourth removing means for removing the encryption key object from data objects embedded in the PFX object.

51. A computer program product in a computer-readable medium for use in a data processing system for processing Personal inFormation eXchange syntax (PFX) objects, the computer program product comprising:
first instructions for presenting an PFX object, including an identification of a type of data item for each data item within said PFX object that is a key, a shrouded key, a certificate, a certificate revocation list, or a secret;
second instructions for determining logical associations between data objects contained within the PFX object;
third instructions for displaying visual indicators representing logical associations between data objects contained within the PFX object; and
fourth instructions for modifying the PFX object through processing of user actions within a graphical user interface.

52. The computer program product of claim 51, wherein the PFX object is formatted according to PKCS (Private Key Cryptography Standard) #12.

53. The computer program product of claim 51, wherein the instructions for modifying the PFX object further comprise:
instructions for selecting a graphical object representing a data object contained within the PFX object;
instructions for displaying data values of the selected data object;
instructions for editing the data values of the selected data object; and
instructions for storing the data values of the selected data object in the PFX object.

54. The computer program product of claim 51, wherein the instructions further include:
instructions for obtaining a PFX object; and
instructions for displaying a name of the PFX object, a version associated with the PFX object, and a data integrity mode of the PFX object.

55. The method of claim 7, wherein presenting a PFX object further includes:
obtaining a PFX object; and
displaying a name of the PFX object, a version associated with the PFX object, and a data integrity mode of the PFX object.

56. The data processing system of claim 7, wherein the presenting means further includes:
means for obtaining a PFX object;
means for displaying a name of the PFX object, a version associated with the PFX object, and a data integrity mode of the PFX object.

57. The method of claim 29, wherein said receiving step receives a cryptographic data object formatted according to PKCS (Private Key Cryptography Standard) #12.

\* \* \* \* \*

UNITED STATES PATENT AND TRADEMARK OFFICE
CERTIFICATE OF CORRECTION

PATENT NO.       : 7,000,108 B1
APPLICATION NO.  : 09/562162
DATED            : February 14, 2006
INVENTOR(S)      : Yarsa et al.

It is certified that error appears in the above-identified patent and that said Letters Patent is hereby corrected as shown below:

Col. 4, line 3: after "4B" delete "is" and insert -- , --.
Col. 4, line 9: after "6B" delete "is" and insert -- , --.
Col. 18, line 12: after "As shown in" delete "Fig. 4" and insert --Figs. 4A and 4B--.
Col. 18, line 66: after "Fig." delete "4" and insert --4A--.
Col. 19, line 4: after "Fig." delete "4" and insert --4A--.
Col. 19, line 9: before "object" delete "List" and insert --list--.
Col. 19, line 21: after "Figure" delete "4" and insert --4A--.
Col. 19, line 25: after "Fig." delete "4" and insert --4A--.
Col. 19, line 40: after "Fig." delete "4" and insert --4A--.
Col. 19, line 42: after "step" delete "514" and insert --513--.
Col. 19, line 45: after "As shown in" delete "Fig. 6" and insert --Figs. 6A and 6B--.
Col. 21, line 29: after "Fig." delete "4" and insert --4A--.
Col. 26, line 32: after "means" delete "flatter" and insert --further--.
Col. 30, line 45: after "claim" delete "7" and insert --29--.
Col. 30, line 51: after "claim" delete 29 and insert --1--.

Signed and Sealed this

Twenty-sixth Day of December, 2006

JON W. DUDAS
*Director of the United States Patent and Trademark Office*